RADIO TELEPHONE DISPATCH CONTROL AND SIGNALING CIRCUIT

Filed March 16, 1955 10 Sheets-Sheet 1

INVENTOR
R.W.COLLINS
BY John E. Cassidy
ATTORNEY

July 15, 1958 R. W. COLLINS 2,843,675

RADIO TELEPHONE DISPATCH CONTROL AND SIGNALING CIRCUIT

Filed March 16, 1955 10 Sheets-Sheet 2

INVENTOR
R. W. COLLINS
BY
John E. Cassidy
ATTORNEY

July 15, 1958 R. W. COLLINS 2,843,675

RADIO TELEPHONE DISPATCH CONTROL AND SIGNALING CIRCUIT

Filed March 16, 1955 10 Sheets-Sheet 3

INVENTOR
R. W. COLLINS
BY
John E. Cassidy
ATTORNEY

INVENTOR
R. W. COLLINS
BY John E. Cassidy
ATTORNEY

RADIO TELEPHONE DISPATCH CONTROL AND SIGNALING CIRCUIT

Filed March 16, 1955 10 Sheets-Sheet 5

INVENTOR
R. W. COLLINS
BY John E. Cassidy
ATTORNEY

RADIO TELEPHONE DISPATCH CONTROL AND SIGNALING CIRCUIT

Filed March 16, 1955 10 Sheets-Sheet 6

INVENTOR
R.W.COLLINS
BY John E. Cassidy
ATTORNEY

RADIO TELEPHONE DISPATCH CONTROL AND SIGNALING CIRCUIT

Filed March 16, 1955 10 Sheets-Sheet 7

INVENTOR
R. W. COLLINS
BY
John E. Cassidy
ATTORNEY

RADIO TELEPHONE DISPATCH CONTROL AND SIGNALING CIRCUIT

INVENTOR
R. W. COLLINS
BY
John E. Cassidy
ATTORNEY

INVENTOR
R. W. COLLINS
BY John E. Cassidy
ATTORNEY

INVENTOR
R. W. COLLINS
BY John E. Cassidy
ATTORNEY

United States Patent Office 2,843,675

Patented July 15, 1958

2,843,675

RADIO TELEPHONE DISPATCH CONTROL AND SIGNALING CIRCUIT

Russell W. Collins, Baldwin, N. Y., assignor to Bell Telephone Laboratories, Incorporated, New York, N. Y., a corporation of New York Application March 16, 1955, Serial No. 494,663

50 Claims. (Cl. 179—41)

Figure 1:
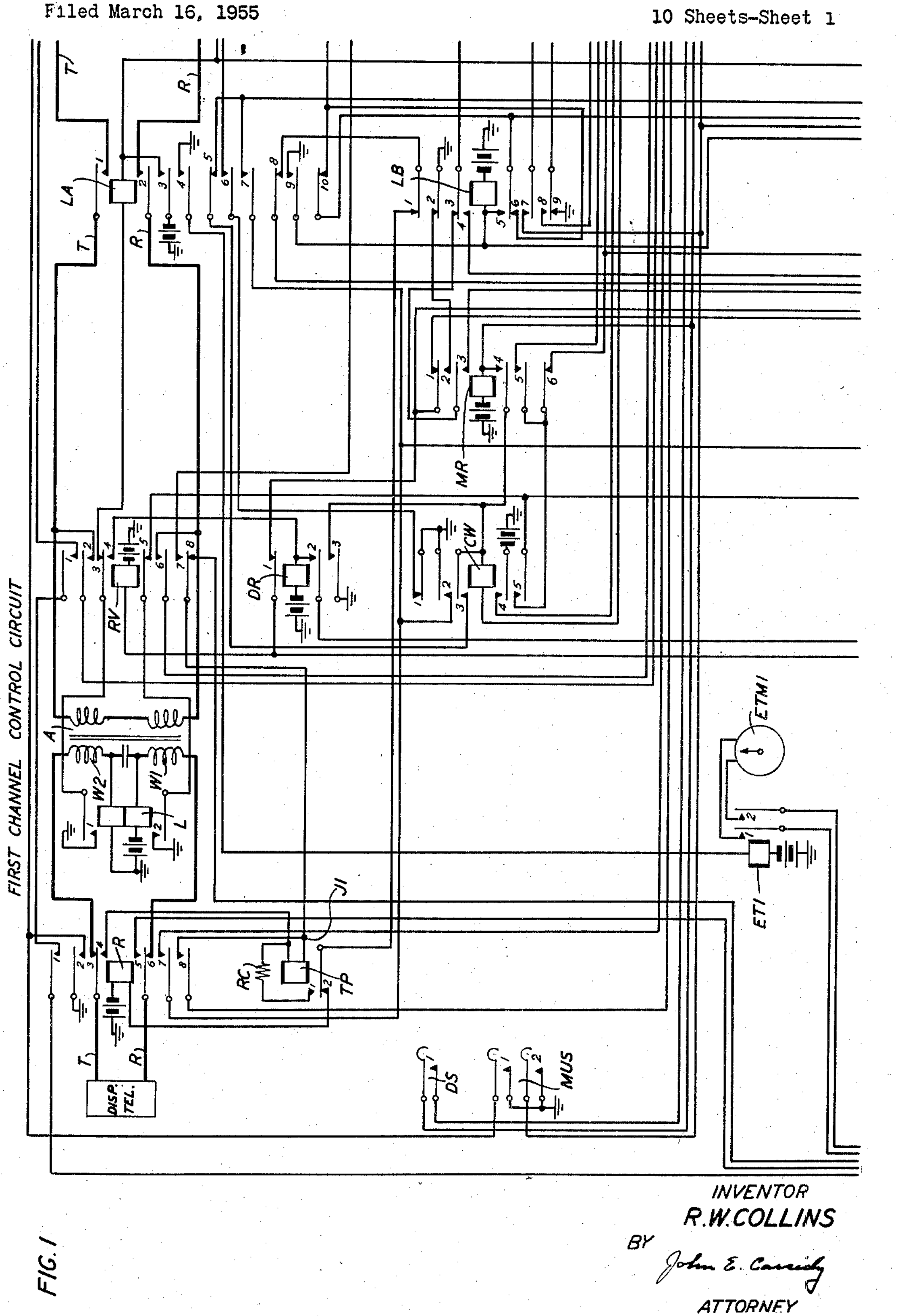

This invention pertains to radio communication systems and more particularly to a two-way radio telephone system. More specifically, the invention is a fully automatic control and signaling circuit for use in radio telephone direct dispatch systems, as they are called, for interconnecting telephone stations and fleets of mobile units.

An object of the invention is the improvement of the control and signaling circuits employed in radio telephone systems.

Another object of the invention is the provision of a fully automatic control and signaling circuit, for a radio telephone system, having a full complement of supervisory and signaling features.

First, in broad outline, in the present system, a number of telephone stations, dispatchers' stations for instance, are each connected to a central or control terminal. The telephone stations are known in the art as dispatchers' stations, because they are used to control, or dispatch, the various fleets of mobile units individual to each station. Directly connected also to the central control terminal are a radio transmitter and a radio receiver. When any station calls, if the system is available, it is automatically connected to the radio transmitter and receiver. The station may be located, for instance, in the office of a trucking company or a taxicab company. Individual to each telephone station is a fleet of trucks or taxicabs or other mobile units.

The circuit of the present invention affords means whereby any dispatcher upon originating a call will selectively energize the radio receivers in the mobile units of his particular fleet. To effect this when any dispatcher originates a call, if the system is not busy, the transmitter at the base station will be responsively energized and a selection will be automatically effected at the base station of a particular one of a number of audio frequencies available at the base station, to identify each dispatcher and each fleet. The transmitting carrier will be modulated with this distinctive audio frequency. The audio amplifier in each of the mobile units will normally be deactivated. In response to the reception of the base station transmitting carrier, modulated with a distinctive frequency individual to a particular dispatcher and to a particular fleet of mobile units, a squelch circuit in the radio receiver, in each mobile unit of the calling dispatcher's fleet, will be selectively controlled to turn on the audio amplifier in the mobile unit, and the audio frequency tone will be heard in a loudspeaker in each such unit. The dispatcher will designate by voice the particular mobile unit for which the message is intended. Thereupon the operator of the designated mobile unit will pick up his handset and will talk to the dispatcher.

When a mobile unit in any dispatcher's fleet wishes to call his dispatcher, he first turns on his transmitter and modulates the transmitter carrier with a frequency individual to the mobile units of the dispatcher's fleet. This is received by the receiver at the base station and applied to the common input of a number of frequence responsive switches, one for each fleet or dispatcher. Some one of the switches will selectively operate, responsive to the particular received audio frequency, and the operated switch will effect a selection of the dispatcher individual to the fleet of which the calling mobile unit is a component. Ringing will be applied to this particular called dispatcher's line and, when he responds, his station will be automatically connected to the radio transmitter and receiver at the base station and two-way conversation may proceed.

The system is completely automatic. No operator is required at the base station. However, the control and signaling circuit at the base station is provided with means whereby an attendant may monitor on the system and communicate over the system as required for maintenance purposes.

A number of the features in the present control and signaling circuit, which also constitute a part of the invention, will now be described generally as an aid in comprehending the detailed description hereinafter.

Only one call can be established through the system at any one time. All dispatchers other than the one conversing at the moment are locked out. While this condition prevails, one feature of the present invention supplies a busy tone to the lines extending to each of the other dispatchers as an indication that the system is in use. If any other dispatcher attempts to make a call at such a time the busy tone will be heard in his receiver.

Another feature of the present invention is a call sequence allotting arrangement whereby, when any dispatcher attempts to make a call, while the system is busy, a registration of the attempted call will be set up in the sequence circuit. A number of such registrations may be set up during any busy period and later, when the system becomes available, each dispatcher's station having a call waiting will be automatically rung so that each one may then complete his call in turn. The order in which each waiting dispatcher gains control of the system is not necessarily the order in which the attempted calls were made.

According to another feature of the invention, the mobile units also have access to the sequence circuit so that they may also register a call waiting. During the period while there are any calls waiting, the allotting of access to the system is under control of the sequence circuit.

According to another feature, upon the completion of each registered call, while there are any calls waiting, the base station transmitter carrier will be modulated with a single interrupted audio frequency tone, distinctive from the tones individual to each fleet or dispatcher. This audio frequency tone will be heard in the receiver of the handset of any mobile unit in any fleet attempting to make a call. It will be transmitted for a measured interval. This will apprise the mobile units of the call waiting condition and during this interval any mobile unit wishing to register a call waiting may turn on its transmitter and modulate the transmitter carrier common to all mobile units with the calling audio frequency individual to his fleet. This will operate his individual frequency responsive switch at the central station and register a call waiting in the sequence circuit.

According to another feature, when a call waiting has been registered both by a mobile unit and by the dispatcher controlling that mobile unit, the sequence circuit gives preference to the call waiting registered by the mobile unit.

According to another feature, the present control and signaling circuit is provided with an elapsed time meter individual to each dispatcher which cumulatively records the usage of the system by each dispatcher or fleet.

According to another feature, the present circuit affords means for applying two distinctive ringing cycles to a telephone bell in the dispatcher's telephone circuit, having differing durations of the ringing and silent intervals, to inform the dispatcher that the ringing is in response to a call which he has made and which has been registered as waiting or that the ringing is for a call originated by a mobile unit.

According to another feature, the present circuit is equipped with revertive ringing means whereby, when a mobile unit initiates a call and his particular dispatcher is being rung, the transmitter at the base station is energized and the carrier is modulated with a distinctive audio frequency tone simultaneously with the application of ringing to the called dispatcher's line as an indication to the calling mobile unit that the dispatcher is being rung.

When a dispatcher's line is being rung, no other dispatcher or mobile unit has operative access to the system. If the called dispatcher does not respond, unless special provision were made, the system would be tied up. Therefore, under this condition, another feature in the present circuit provides means whereby the dispatcher's line is rung for only a fixed predetermined interval, after which ringing is automatically stopped and the system is made available to other parties.

In accordance with another feature, the circuit includes communication means at the base station, whereby the present automatic system may be monitored by an attendant and also includes means for disabling the circuit for maintenance purposes when required.

According to another feature, the circuit provides means whereby, while the circuit is disabled and an attendant is connected to the circuit for maintenance purposes, an indication of an attempted call by a mobile unit is provided.

Other features are a complement of alarms which afford indications of numerous possible abnormal conditions.

There are many other features in the present circuit, which circuit affords comprehensive signaling and supervisory controls for a two-way fully automatic radio telephone system, which features will become apparent in the detailed description hereinafter.

The detailed operation of the circuit may be understood from the following description when read with reference to the associated drawings, which disclose a preferred embodiment in which the invention is presently incorporated. It is to be understood, however, that the invention may be incorporated in other forms which may be suggested to those skilled in the art from a consideration of the description herein.

Figure 11:
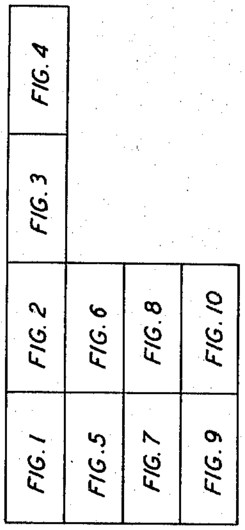

The drawings comprise eleven figures, Figs. 1 to 11, inclusive, in which Fig. 1 to Fig. 10, inclusive, arranged as shown in Fig. 11, form a unitary circuit showing the special direct dispatch control and signaling circuit of the invention.

Since Figs. 1 to 10 constitute a single unitary circuit, the component parts are not readily identifiable in terms of the separate figures. However, preliminary to the detailed description, certain of the major circuit components will be idenitfied in the general description following.

Figure 5:
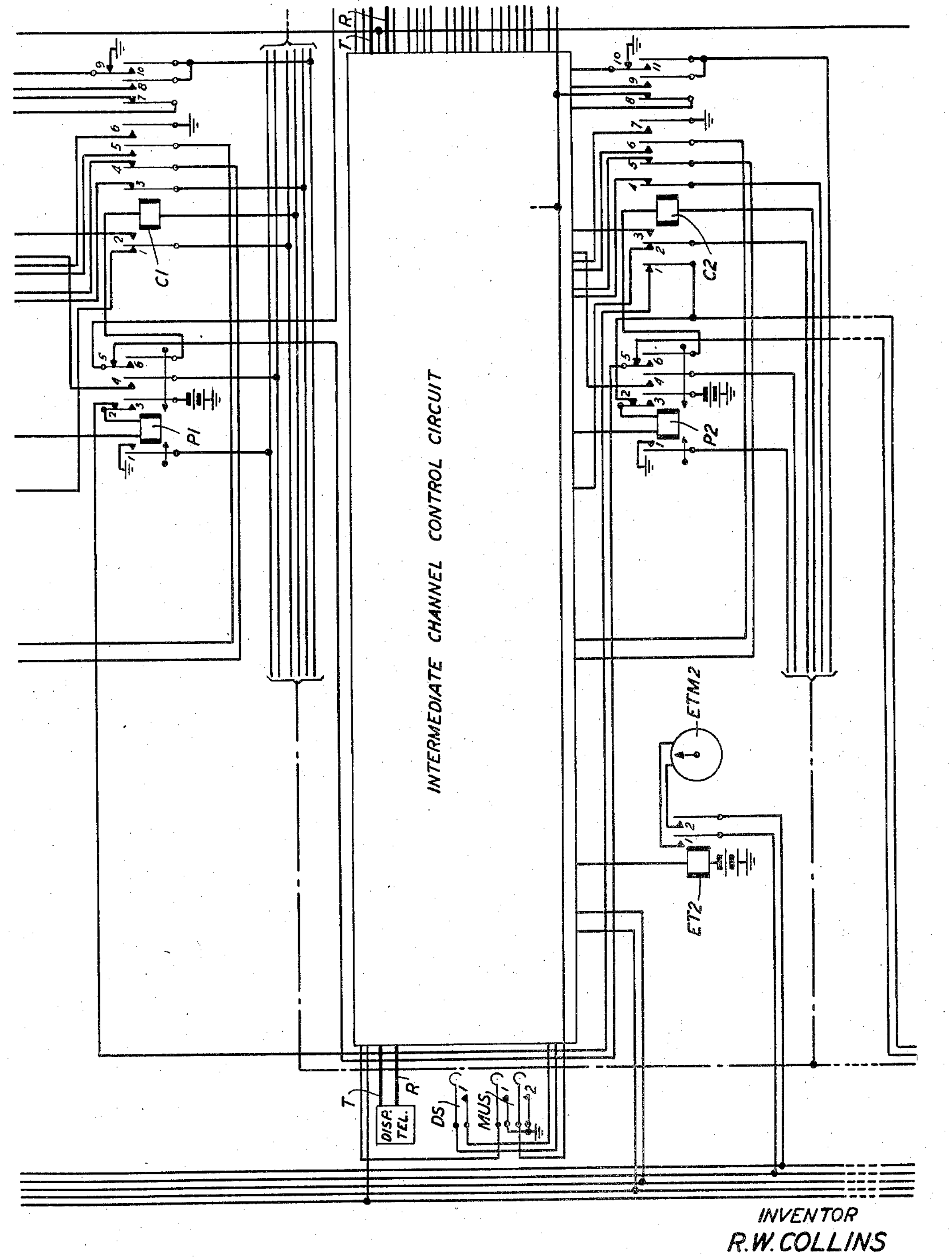
Figure 7:
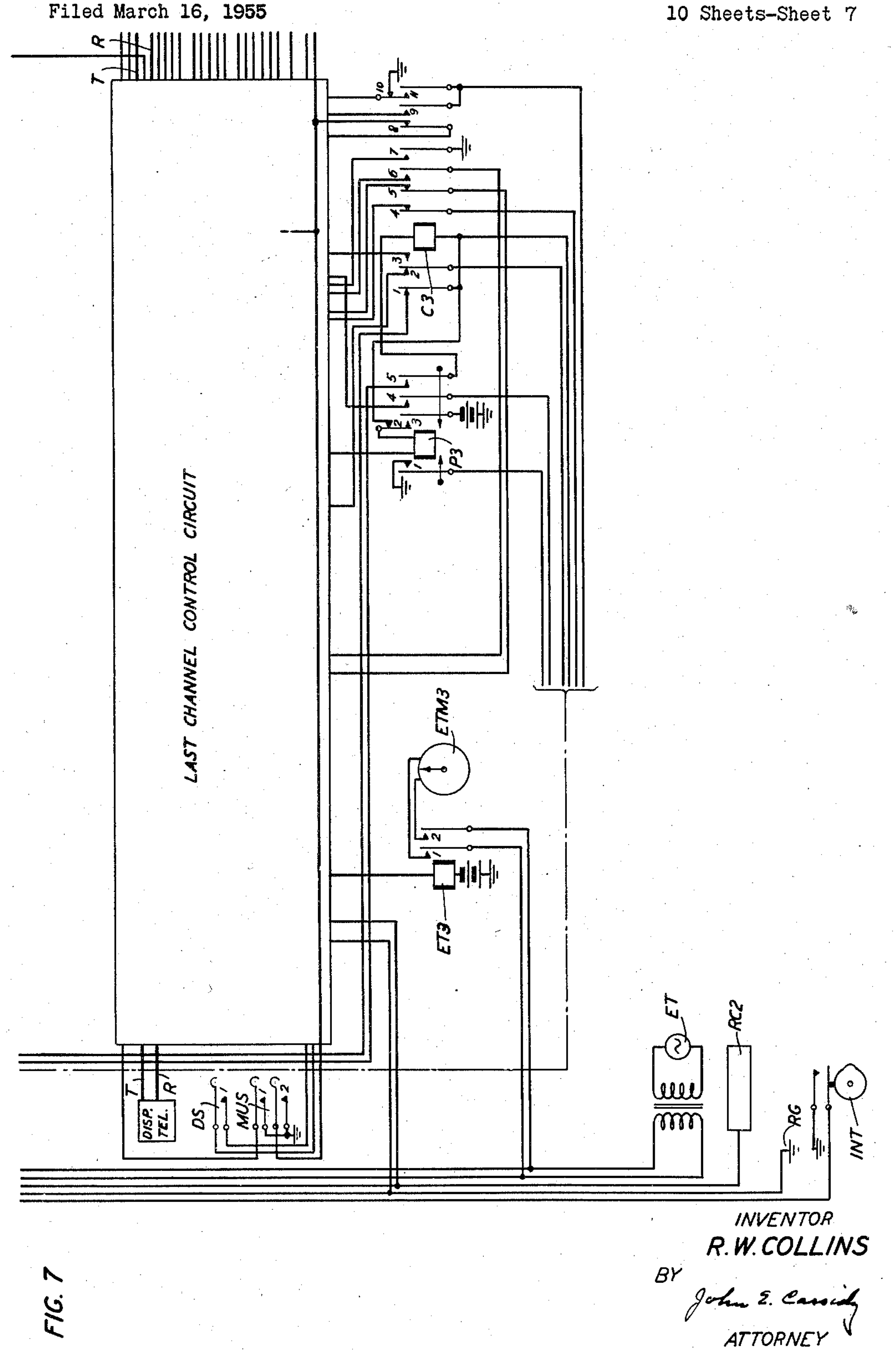

At the left in each of Figs. 1, 5 and 7, is a rectangle captioned DISP-TEL. These rectangles represent the dispatcher's telephone circuits. Only three are shown. From top to bottom in these figures these dispatcher telephone circuits represent the first, the intermediate and the last dispatcher telephone circuit in the system. The dispatcher's telephone circuit in Fig. 5 symbolizes all those intermediate the first and the last in the system and may comprise any number from 1 to 10 or more such as 20 or 30 if desided. In general, the present system is intended for use of from 1 to 10 dispatchers, but circuitwise there is no such restriction and any number may be connected to the system, the limitation being only that, since but one conversation can be held at any one time, the number of dispatchers that may be satisfactorily handled will be limited by traffic conditions and standards of service required.

Figure 2:
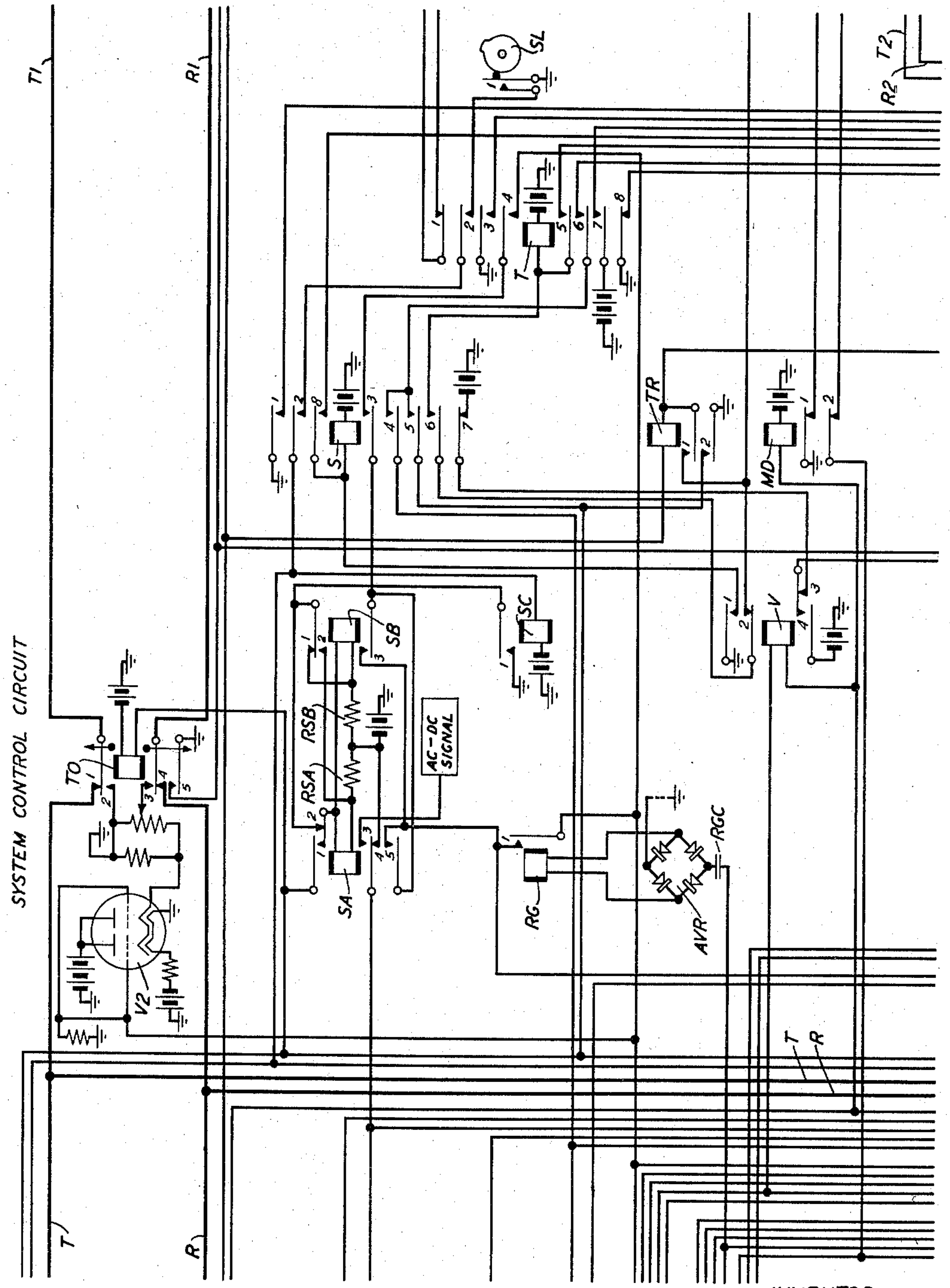
Figure 3:
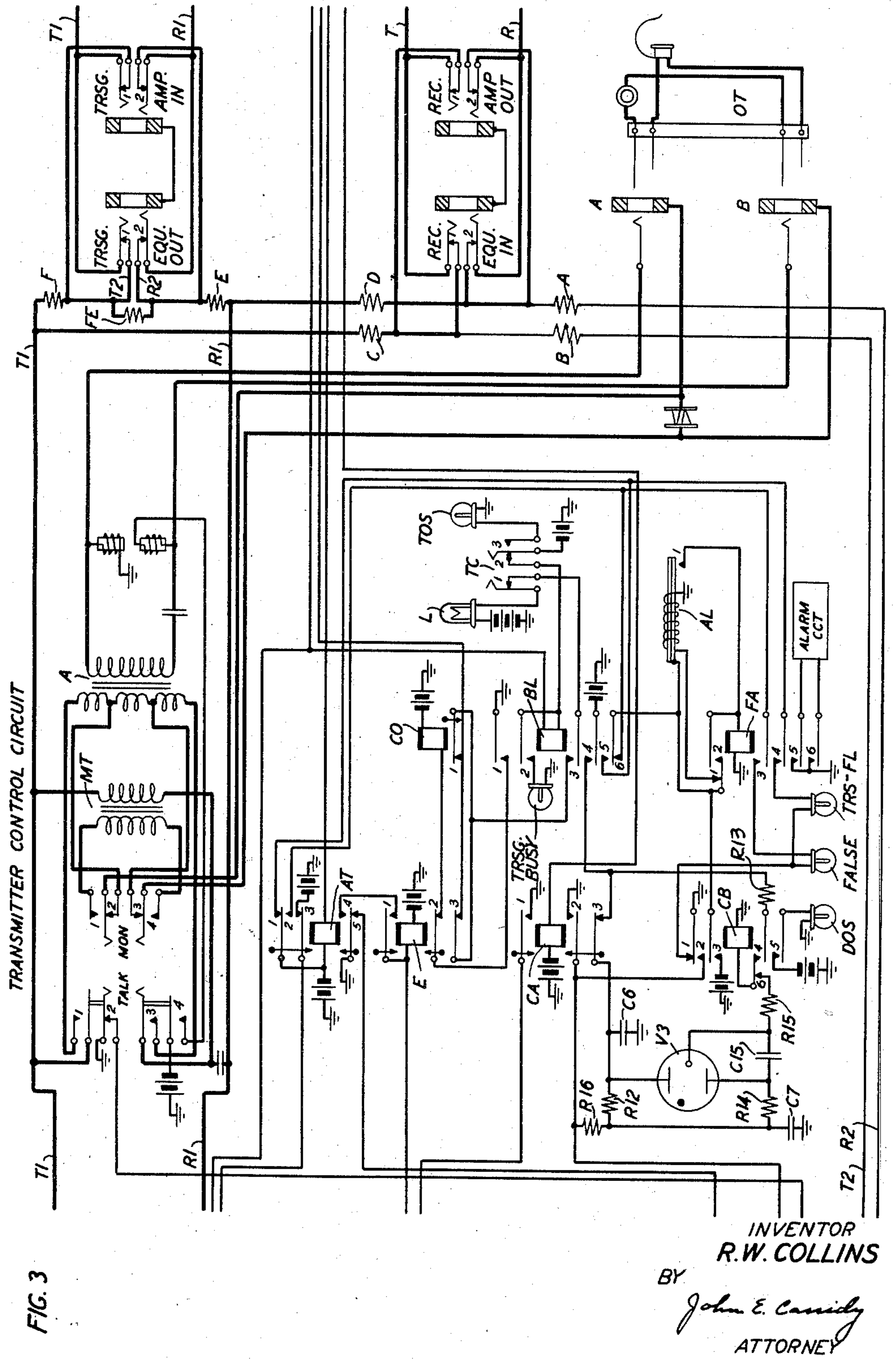

Each dispatcher is connected to a channel control circuit at the base station by means of two conductors, such as conducotrs T and R in Fig. 1. Each dispatcher has an individual channel control circuit, shown in detail in Fig. 1, which is the first channel control circuit, and indicated by captioned rectangles in Fig. 5, which represents all intermediate channel control circuits, and in Fig. 7, which represents the last such circuit. The individual channel control circuit is the means whereby each individual dispatcher is connected to the common equipment which is located at the same base station with the channel control circuits. The common equipment comprises a system control circuit, shown in Fig. 2 and in Fig. 6, and a transmitter control circuit, shown in Fig. 3. From the transmitter control circuit a circuit extends to the radio transmitting station, shown in the upper right portion of Fig. 4 and to the radio receiving station, shown in the middle right portion of Fig. 4. The telephone circuit shown in the lower right-hand portion of Fig. 3 is the means whereby an attendant may monitor and communicate through the system for maintenance purposes when required.

Figure 9:
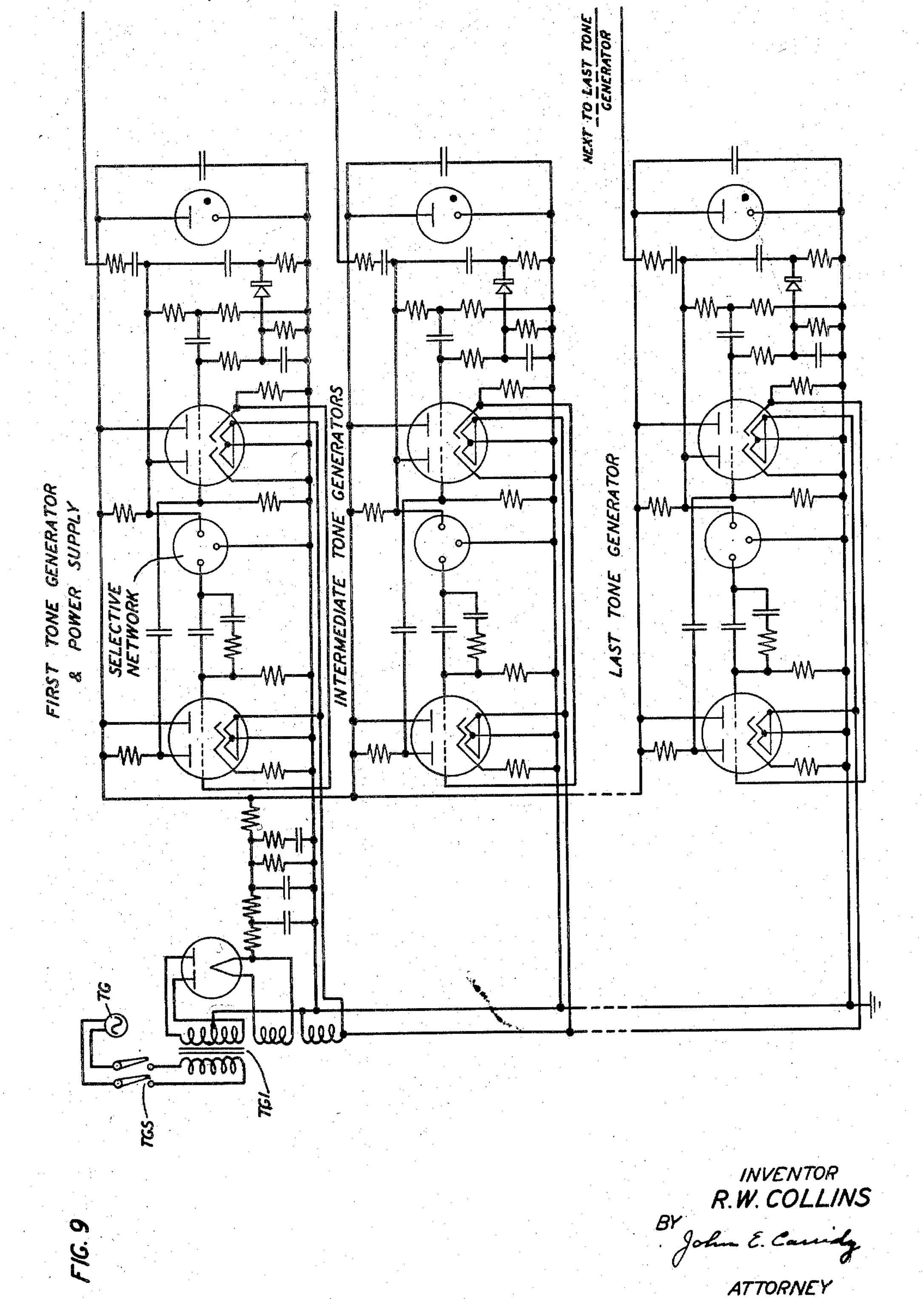

It was mentioned in the foregoing that each dispatcher has an individual audio tone generator which is used to modulate the transmitter carrier to call his particular fleet. These tone generators are shown in Fig. 9. Tone generators are well known in the art. The General Electric Company 7667061–G1 E/W Panel, 7773208–G2 Generator and 7484507 Network are satisfactory for the present purpose. There will be as many tone generators as there are dispatchers and in addition there is required one extra tone generator, shown in Fig. 9 as the last tone generator. It is particularly pointed out that the last tone generator is not individual to the last dispatcher's control circuit but is common to the system. It is used to generate a distinctive audio tone, which is interrupted and with which the transmitting carrier is modulated. This tone is transmitted through the radio transmitter and is heard in the receiver of the handset of any mobile unit attempting to make a call, to designate an interval during which a mobile unit can register a call waiting when there are other calls waiting in the sequence circuit. The audio tone from the last tone generator is employed also as the reverting ringing signal to a calling mobile unit when a dispatcher is being rung. For this purpose it is interrupted, at a different rate, and simultaneously with the interruptions of the ringing applied to the called dispatcher's line.

Figure 8:
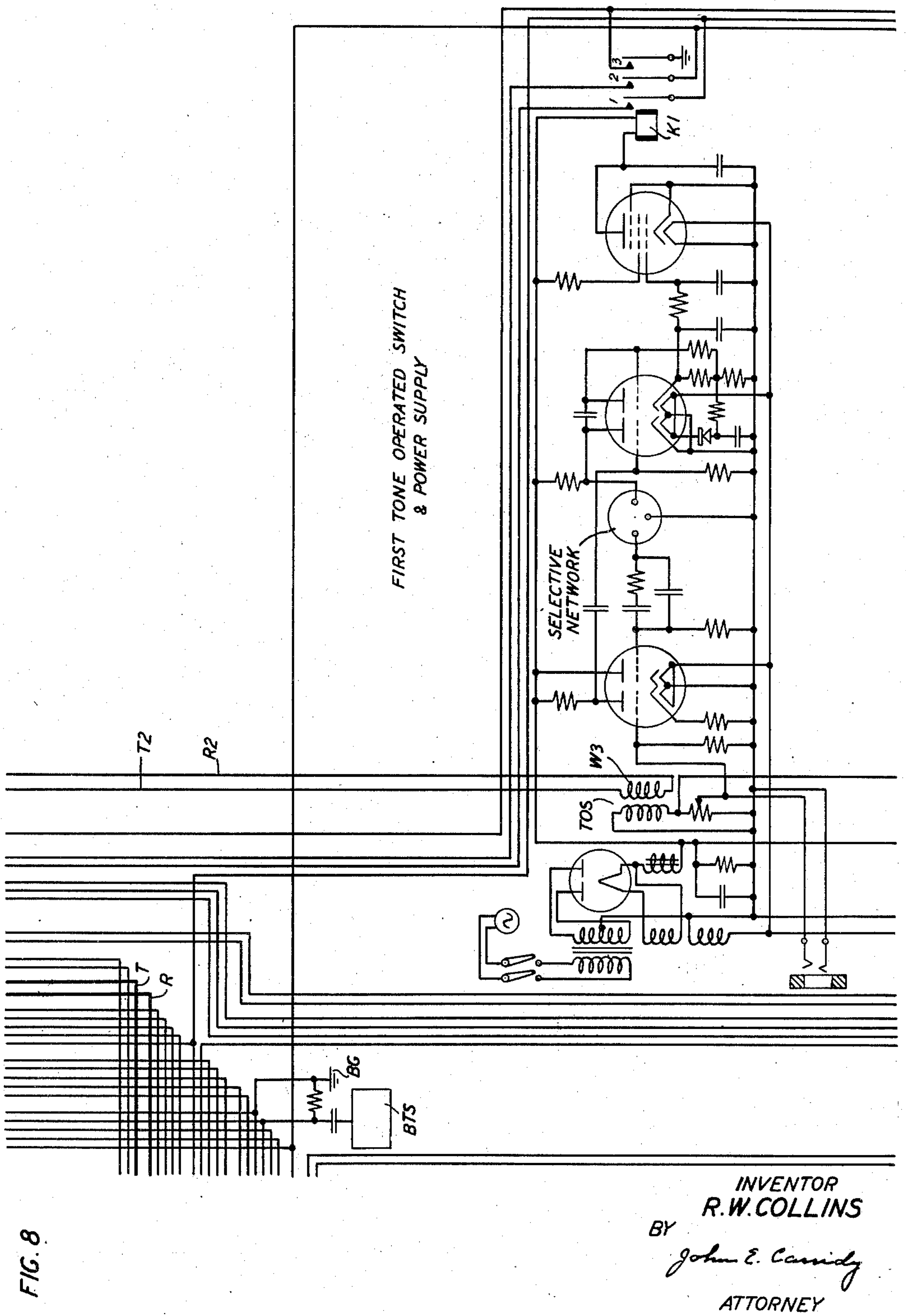
Figure 10:
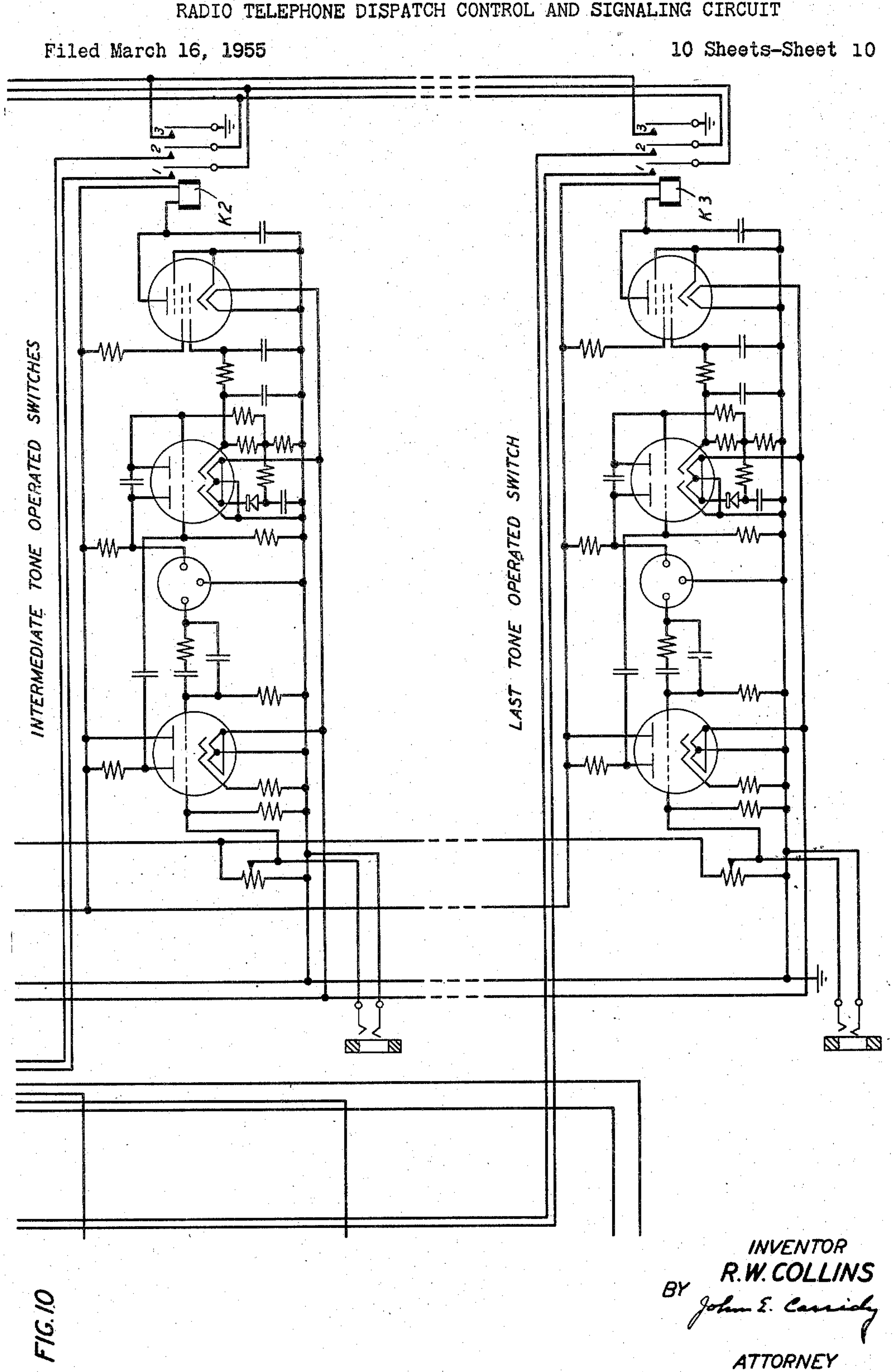

It was mentioned in the foregoing that each fleet of mobile units is equipped to transmit a common carrier frequency, modulated with a distinctive single frequency, one distinctive modulating frequency for each fleet, in order to select its particular dispatcher. When any unit of a mobile fleet initiates a call, its transmitting carrier is modulated with the particular single frequency individual to the fleet which selectively operates an individual tone operated switch for each fleet or dispatcher. Such switches are well known in the art. The General Electric Company 7668312G1 E/W Switch Panel, 7123744G2 Switch and 7484507 Network are satisfactory for the purpose. They are shown in Figs. 8 and 10.

As will become apparent hereinafter, when any mobile unit calls, a frequency characteristic of its particular fleet is applied to the common input of all of the tone-operated switches. The input circuit associated with the switch is permanently bridged onto the line incoming from the radio receiving station. The path may be traced from jack REC. EQU. IN through conductors T1 and R1, resistors B and A and conductors T2 and R2 to input winding W3 associated with the tone-operated switch transformer TOS. The output circuit of this transformer is applied in parallel to the input of each tone-operated switch, such as the first tone-operated switch shown in Fig. 8, the intermediate tone-operated switch, which typifies all intermediate switches, shown in the upper portion of Fig. 10, and the last tone-operated switch, which is associated with the last dispatcher's circuit, shown in the bottom of Fig. 10. A particular one of these tone-operated switches will respond to the particular tone sent by any unit of any mobile fleet. This will operate the relay such as relay K1, K2 or K3, shown at the right of the first, second and last switch, respectively, to effect selection of the particular dispatcher individual to the fleet.

It was mentioned in the foregoing that calls waiting are registered in a sequence circuit. The sequence circurit is common to the system but comprises components such as relays P1 and C1, P2 and C2, P3 and C3, shown in Fig. 5 and Fig. 7, which are individual to each dispatcher's control circuit. If any dispatcher or any unit of his fleet attempts to gain access to the system and the system is busy at the time, the components of the sequence circuit individual to the dispatcher's channel will be operated to register a call waiting and the system will thereafter be made available in a predetermined sequence to all parties having a call waiting.

Figure 6:
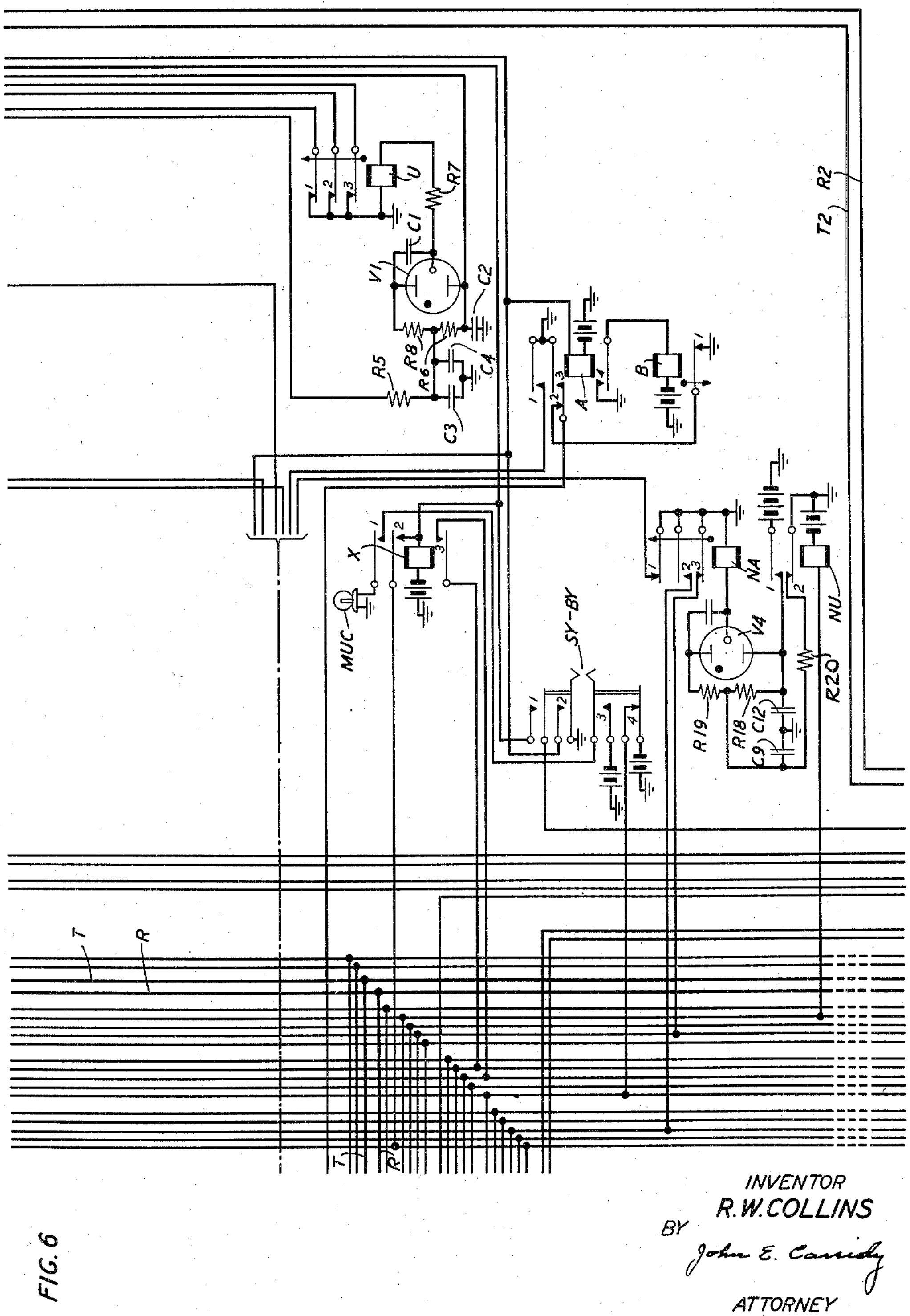

There are three timing circuits, one shown in Fig. 3 and two shown in Fig. 6. These comprise gas tube V3 and its associated resistor and capacitor timing components in Fig. 3 and gas tube V1 and V4 with their individual timing elements in Fig. 6. These circuits measure the various timed intervals employed in the system to be described in detail hereinafter.

The operation of the system will now be described in detail.

When the system is idle a circuit may be traced from grounded battery, through the bottom winding of relay L, Fig. 1, winding W1 of repeating coil A, contact 6 of relay R and conductor R to the distant dispatcher's telephone circuit. The dispatcher's telephone circuit is normally open when the circuit is idle except for the ringing path through a ringer and condenser which is bridged between conductor R and conductor T. Continuing, the return circuit may be traced through conductor T, contact 3 of relay R, winding W2 of repeating coil A and the top winding of relay L, to ground.

*Call originated by a dispatcher—system idle*

When a dispatcher originates a call by removing his handset from its cradle, the associated relay L operates over a circuit heretofore traced. The operation of relay L establishes a circuit from ground through contact 1 of relay L, contact 3 of relay RV, winding of relay LA and contact 3 of relay AT, Fig. 3, to battery operating relay LA. The operation of relay L also establishes a circuit from ground through contact 2 of relay L, contact 5 of relay RV, contact 1 of relay C1, Fig. 5, winding of relay TR, Fig. 2, and contact 3 of relay AT to battery operating relay TR. The operation of relay TR establishes a circuit from ground through contact 2 of relay TR and the winding of relay TO, Fig. 2, to battery operating relay TO. Normally, after the operation of relay LA, the line from the dispatcher's telephone circuit is closed at contacts 1 and 4 of relay TO to the line to the radio station at the control terminal. Now that relay TO is operated, the line to the base radio station is connected through contacts 2 and 3 of relay TO to the output of amplifier V2 to prepare the circuit for transmission of the channel identification tone when the tone is supplied by relay LB, in a manner to be described. Since it is necessary to transmit the tone for approximately 0.3 second after the "carrier" is on, the operate path for relay TR, which was traced through contact 1 of relay C1, will be opened by the operation of relay C1, in a manner to be described, to permit relay TO to release. However, a holding path is established for relay TR which may be traced from battery through contact 3 of relay AT, winding of relay TR, contact 1 of relay TR and contact 5 of relay AT to ground, which ground replaces the ground supplied through contact 2 of relay L, after relay C1 operates. Relay AT is operated in a manner to be described after the "carrier" is on and since relay TO is slow to release, relay TO will continue to transmit tone for approximately 0.3 second after the "carrier" is on the air.

The operation of relay LA establishes a circuit from ground through contact 4 of relay LA and the winding of relay ET1 operating relay ET1. The operation of relay ET1 establishes a circuit from an alternating-current source ET, Fig. 7, through contacts 1 and 2 of relay ET1 to actuate the elapsed time meter ETM. The elapsed time meter is a device which registers cumulative elapsed time representing the time of usage of the channel with which it is associated. One such meter is associated with each channel. Such devices are well known in the art. The operation of relay LA by closing its contacts 1 and 2 extends the line from the dispatcher's telephone set, associated with the first channel, to the radio transmitter and radio receiver at the base radio station, under control of relay TO. The operation of relay LA also establishes a circuit which may be traced from ground through contact 1 of relay CW, Fig. 1, contact 6 of relay LA and the winding of relay MD, Fig. 2, to battery operating relay MD. The operation of relay LA establishes a circuit from ground through its contact 9 and the winding of relay LB, Fig. 1, to battery operating relay LB. When relay LA operates it locks over a circuit from battery through contact 3 of relay LA, winding of relay LA and back through the circuit heretofore traced to ground on contact 1 of relay L. The operation of relay LA also establishes a circuit from ground through contact 9 of relay C2, Fig. 5, contact 7 of relay LA, winding of relay P1, Fig. 5, contact 2 of relay P1, contact 1 of relay C2, Fig. 5, contact 1 of relay C3, Fig. 7, contact 3 of relay V, Fig. 2, and contact 7 of relay S to battery operating relay P1. The operation of relay MD by opening its contact 2 disconnects ground supplied through contact 2 of key Talk, Fig. 3, contact 2 of relay MD to contacts 2, in parallel, of all the relays such as relay K1 in all of the tone-operated switches, Figs. 8 and 10. The disconnection of this common ground through the operation of relay MD prevents any mobile unit from signaling any dispatcher once any dispatcher has obtained control of the system. As will be made clear hereinafter, the present system includes equipment for registering "calls waiting." This cannot be performed while the system is in use. It will be made apparent later that a separate special interval is allocated for registering calls waiting.

The operation of relay LB, Fig. 1, establishes a circuit which extends from the grids of double-triode amplifier V2 through contact 8 of relay LB to the output lead of the first tone generator, Fig. 9. There is a tone generator for each channel which produces a tone having a frequency individual to the channel. When power is supplied from an alternating-current power source TG, Fig. 9, through the operation of the associated double pole switch TGS, to the input of transformer TG1, each of the tone generators, which is a well-known oscillator circuit connected through an individual selective tuning network, produces an individual frequency for each one of the tone generators. The tone individual to channel 1 and the first dispatcher, applied to the grids of the common amplifier V2, effects the transmission of the tone through the transmission path extending through amplifier A to the radio transmitting station, where it modulates the transmitting carrier and is broadcast to the mobile units. The operation of relay LB establishes a circuit from ground through contact 3 of relay NA, Fig. 6, contact 4 of relay LB, to contact 4 of relay P1. After relay P1 operates the circuit is extended through the winding of relay BL and contact 2 of transmitting carrier key TC, Fig. 3, to battery, to prepare for operating relay BL, to turn on the transmitter at the control terminal, after relay P1 operates. The control circuit of relay BL is connected through the contacts of relay P1, as relay P1 is slow to operate, to delay turning on the transmitter until relay TO is operated as described in the foregoing. At this time relay S and relay V are released, as shown in Fig. 2, and a circuit is established from battery through contact 7 of relay S, Fig. 2, contact 3 of relay V, contact 1 of relay C3, Fig. 7, contact 1 of relay C2, Fig. 5, contact 2 of relay P1, Fig. 5, winding of relay P1, contact 7 of relay LA, Fig. 1, and contact 9 of relay C, Fig. 5, to ground, operating relay P1 associated with the first channel. Relay P1, Fig. 5, when operated, establishes a circuit from ground through contact 1 of relay P1, winding of relay A, Fig. 6, to battery operating relay A. Relay P1, operated, establishes a circuit from ground through contact 1 of relay B, Fig. 6, contact 2 of relay A, before relay A operates, contact 6 of relay P1, Fig. 5, winding of relay C1, contact 3 of relay V, Fig. 2, and contact 7 of relay S to battery, operating relay C1. The operation of relay P1 also closes the circuit traced through its contact 4 and the winding of relay BL which now operates. Relay A, Fig. 6, operated establishes a circuit from ground through its contact 1, and through contacts 4 of all relays such as relay C2 and C3 in all other channels. Contacts 4 of all such relays correspond to contact 3 of relay C1 there being one less contact on relay C1 than on other C1 relays such as C2 and C3. From these contacts 4 of relays such as relay C2 and relay C3 circuits extend through elements in the other channel control circuits corresponding to that connected to contact 3 in channel 1 and therefore extends through contacts such as contact 1 of relays such as relay MR and contacts such as contact 1 of relays such as relay DR and the windings of relays in the other channel corresponding to relay RV in channel 1 to battery operating all relays such as relay RV in all channels other than channel 1. Relay C1 in channel 1 is operated, so relay RV in channel 1 cannot operate. All other RV relays, when operated, establish circuits from the open contacts 1 of relays L which extend through contacts 4 of relays RV and the windings of relays DR to battery. If any of the other dispatchers attempts to make a call, his L relay will operate, as described, connecting ground through contact 1 of the operated relay to operate the relay DR in his channel control circuit. The operation of the relays RV also establish circuits from the busy tone supply BTS and busy ground BG, Fig. 8, through contacts 2 and 6, respectively, of the operated relays RV to the lines extending to the associated dispatchers' stations through the repeat coil A. Any dispatcher attempting to make a call under this condition will hear the busy tone in his receiver as an indication that the system is in use. The operation of relay C1 in the control circuit of the dispatcher presently using the system by opening its contact 1 opens the operating path of relay TR, Fig. 2, which remains locked through contact 1 of relay TR and contact 5 of relay AT, Fig. 3. The operation of relay C1 disconnects the operating ground for relay P1 by opening contact 9 of relay C1 and by closing contact 10 of relay C1, transfers the circuit for holding relay P1 to a path which extends through contact 1 of relay NA, Fig. 6, to ground. The battery supply for operating any P— relay, except relay P3 in the last channel, is supplied through a chain circuit which extends from battery through contact 7 of relay S, Fig. 2, contact 3 of relay V, contact 1 of relay C3 associated with the last channel, contact 1 of all relays such as relay C2, which represents the corresponding relay in all intermediate channels, and then through contact 2 and the winding of relay P1 in the first channel. When any C— relay operates, except relay C1, associated with the first channel, the battery supply chain to all other P— relays served through the contact of the operated C— relay is disconnected and cannot therefore operate. Relay BL, Fig. 3, operated, establishes a circuit extending from battery through the filament of lamp L, contact 1 of key TC, contact 3 of relay BL, contact 1 and contact 3 of relays CO and E, respectively, in parallel, winding of inductance coil F, Fig. 4, winding 4 of repeating coil TR and conductor R to the radio transmitting station where the circuit extends through the winding of the transmitter plate control relay, not shown, to battery to operate the relay and turn on the transmitter carrier. When the control station transmitter is radiating power its monitor relay, not shown, operates and connects ground at the radio transmitting station to the conductor T and the circuit is extended through winding 3 of repeating coil TR, winding of inductance E and the winding of relay AT to battery, operating relay AT. Relay AT operated, by opening its contact 5, disconnects the holding ground from relay TR which releases. Relay TR released, by opening its contact 2, opens the operating path for slow-to-release relay TO which has a release time of 0.3 second. Since the operation of relay TO effects the modulation of the carrier at the control or base station transmitter with the tone individual to the particular calling dispatcher, the transmission of this tone for 0.3 second after operation of the AT relay in response to the monitored transmitter is insured, since relay TO cannot begin to release until relay TA operates. All of the selectors in the fleet of mobile units individual to the calling dispatcher function, in response to a pulse of the duration of 0.3 second, to open the squelch circuits of the receivers in the mobile units and "key on" the associated loudspeakers. Thus, each mobile unit in the fleet individual to each dispatcher is called simultaneously and the particular mobile unit or units for which the message is intended may be designated by the dispatcher's voice.

Squelch circuits are well known in the art. They are described, for instance, in Patent 2,527,617, granted to U. S. Berger April 17, 1950, and in Patent 2,589,711, granted to L. Y. Lacy March 18, 1952, which are hereby made part of the present disclosure as though fully set forth herein.

When the called mobile unit or units answer, it is necessary to reset the squelch circuits of all other mobile units in the calling dispatcher's fleet. The manner in which this is performed will now be described.

It has been explained that the battery supply for the plate relay at the base transmitting station is furnished through the filament of lamp L, contact 1 of key TC, and contact 1 of relay CO and contact 3 of relay E in parallel. When relay BL is operated to supply this battery, it establishes a circuit from ground through contact 1 of relay BL, contact 2 of relay E and the winding of relay CO to battery operating relay CO. This opens the parallel branch through contact 1 of relay CO. In response to the reception of the call by the mobile unit a push-to-talk button of the mobile unit handset is operated. This transmits carrier from the answering mobile unit. In response to this a relay, not shown but well known in the art as a codan relay, connected to the radio receiver at the base station, is operated which establishes a circuit from ground at the base radio receiving station, Fig. 4, over conductors T1 and R1, in parallel, coils 1 and 2 of repeating coil REC, in parallel, and through the winding of relay CA, Fig. 3, to battery operating relay CA. Relay CA, operated, establishes a circuit from ground through its contact 1, contact 1 of relay T, Fig. 2, and the winding of relay E, Fig. 3, to battery operating relay E. The operation of relay E, by opening its contact 3, interrupts the base station transmitter carrier, by opening the second parallel branch through which the plate relay of the transmitting carrier is controlled. The operation of relay E, by opening its contact 2, opens the operating path for slow-to-release relay CO which releases slowly closing its contact 1 and reestablishing one of the parallel branches controlling the plate relay of the transmitting carrier which operates to again turn on the transmitting carrier. Relay E has a locking path through its contact 1 and contact 4 of relay AT to ground which maintains relay E operated which in turn maintains relay CO released so that the transmitting carrier from the base station now remains on and cannot be interrupted each time a mobile push-to-talk button is operated. The momentary interruption of the base station transmitter carrier resets the squelch circuits of all of the mobile units in the particular dispatcher's fleet with the exception of the one designated by the dispatcher for whom the call was intended. This receiver is not affected because the squelch control circuit is disconnected when the handset is removed from its hanger.

*Call originated by mobile unit—system idle*

When a call is originated by a mobile station, the handset push button is momentarily operated. This operation turns on the mobile transmitter and modulates its carrier with a burst of identifying audio frequency tone. Each individual fleet of mobile units is assigned a different single individual audio frequency tone. There is a different frequency for each fleet. The carrier, modulated with the fleet identifying frequency transmitted from the calling mobile unit, is received by the base radio station. The identifying frequency is passed from the radio receiving station through the receiving branch of the circuit, comprising conductors T1 and R1, repeating coil REC, amplifier B, conductors T and R, resistors B and A and conductors T2 and R2 and impressed on input coil W3 of transformer TOS, the output of which is impressed in parallel on the input of an amplifier corresponding to amplifier V1701 in each of the tone-operated switches. There is one such switch for each dispatcher, or truck fleet. Each switch consists essentially of a highly selective audio amplifier and a vacuum tube operated relay. The function of the switch is to selectively operate its associated relay K— in response to a particular audio frequency. The individual switch circuit employs two stages of amplification, a cathode follower and a selective network to provide a frequency selective negative feedback loop. Any switch which selectively responds to audio frequency tones in the presence of other tones to operate a direct-current relay obviously may be employed instead of the switch and the power supply designated. The particular switch tuned to respond to the particular frequency will respond, operating its K— relay. It will be assumed that one of the mobile units of the fleet, controlled by the dispatcher connected to the first channel control circuit, is calling and that the first tone-operated switch and relay K1 responds. The operation of relay K1 establishes a circuit which may be traced from ground through contact 2 of key Talk, Fig. 3, contact 2 of relay MD, Fig. 2, which is released, as it is assumed that the system is available, contact 2 of relay K1, Fig. 8, and the winding of relay MR, Fig. 1, to battery operating relay MR. Relay MR, operated, establishes a circuit from the same ground by means of which it was operated through contact 4 of relay MR, winding of relay CW and contact 4 of system busy key SY–BY, Fig. 6, to battery operating relay CW. Relay MR, operated, locks over a circuit from battery through its winding and its contact 4, contact 3 of relay CW, contact 5 of relay LA, which is released, and contact 9 of relay C1, Fig. 5, to ground. Relay CW, operated, locks from battery through contact 4 of system busy key SY–BY, winding of relay CW, contact 3 of relay CW over the path traced from this point by means of which relay MR was locked. Relay CW, operated, establishes a circuit from ground through its contact 2, winding of relay P1, contact 2 of relay P1, contact 1 of relay C2, Fig. 5, contact 1 of relay C3, Fig. 7, contact 3 of relay V and contact 7 of relay S to battery operating relay P1. The operation of relay P1 operates relay A, Fig. 6, as heretofore described. Whenever relay A operates, it supplies ground through its contact 4 and the winding of relay B to battery operating relay B. The operation of relay P1 in turn operates relay C1 as described in the foregoing. Relays MR and CW do not release when relay C1 operates as the ground supplied through contact 9 of relay C1 to hold these relays operated is replaced by ground supplied through make-before-break contact 10 of relay C1 from contact 1 of relay NA. Relay MR, Fig. 1, operated also establishes a circuit from ground through contact 2 of relay LB, Fig. 1, contact 2 of relay MR, contact 1 of relay DR and the winding of relay RV to battery, operating relay RV, to arrange for ringing the called dispatcher with a first type of distinctive ringing signal identifying a call incoming from a mobile unit in his fleet. As will become apparent hereinafter a second type of distinctive ringing signal is employed to call the dispatcher when the system is available after he has attempted to call one of his units and has found the system busy. The operating path from contact 2 of relay LB for operating relay RV is necessary because the ground from relay A is removed when relays C1 and MR are operated. Relay C1 operated also establishes a circuit from ground through its contact 6, contact 8 of relay LA, contact 1 of relay LB, contact 2 of relay TP and the winding of relay R to battery operating relay R. Relay R, operated, establishes a circuit from ground through interrupter INT, Fig. 7, which connects ground once per second, contact 1 of relay R, contact 1 of relay RV and the winding of relay SC, Fig. 2, to battery operating relay SC once per second. The R relay operated also establishes a circuit from ground through contact 2 of relay R to contact 1 of relay SA, Fig. 2. Relay SC, operated, connects ground through to the windings of relays SA and SB, Fig. 2, to operate these relays alternately in a manner to be described hereinafter. When relay SA is operated, in a manner to be described, it is held operated from ground supplied through contact 2 of ringing relay R, Fig. 1, and contact 1 of relay SA to insure that relay SA and SB release when ringing relay R releases. Relay SA is operated for one-second intervals and released for one-second intervals. While it is operated, ringing is supplied from a source of alternating current superimposed on direct current through contact 3 of relay SA, contact 7 of relay RV, winding of relay TP and contact 4 of relay R over conductor T, through the ringer at the called dispatcher's station, returning over conductor R, through contact 5 of relay R to ringing ground RG, Fig. 7. This type of ringing, namely one second ringing followed by one second of silence per cycle, indicates that the dispatcher is being called by one of the mobile units of his fleet. Relay R operated also establishes a circuit which extends from junction J1, Fig. 1, in the ringing path last traced through contact 8 of relay R, capacitor RGC, Fig. 2, full-wave varistor rectifier AVR and the winding of relay RG to ground, operating relay RG during each one-second interval while ringing is applied to the called dispatcher's line on a call from one of his mobile units. The operation of relay R also establishes a circuit from ground through contact 2 of relay R and the winding of relay TO, Fig. 2, to battery operating relay TO.

Relay TO, operated, establishes a circuit from ground through its contact 5, winding of relay BL, Fig. 3, and contact 2 of key TC to battery, operating relay BL. Relay BL, operated turns on the transmitter as heretofore explained. Relay TO operated also establishes a circuit from the output of the last tone generator, Fig. 9, through contact 1 of relay RG, Fig. 2, to the input circuit of amplifier V2, Fig. 2, and the output of amplifier V2 is applied through contacts 2 and 3 of relay TO on the circuit which extends to the base radio transmitting station. Each time ringing is applied to the dispatcher's telephone circuit, a distinctive tone generated by the last tone generator will modulate the base station transmitting carrier. This tone will be heard in the receiver of the calling unit and will serve to indicate that the called dispatcher's line is being rung. It is particularly pointed out that a tone of a distinctive different frequency is used to call each fleet. However, a tone of a single frequency is always used to modulate the transmitting carrier as an indication that the dispatcher's line is being rung. As will appear hereinafter, this same tone is used for another purpose, namely to designate a so-called waiting interval during which mobile units may register a call waiting when the system is busy. If the dispatcher does not respond to the ringing signal applied to his line during an interval of approximately 40 seconds, ringing is automatically stopped by the operation of a timing circuit associated with relay NU to be described in detail hereinafter.

When the dispatcher answers the call, ground from the ring side of the line through the telephone set operates relay TP. Relay TP passes alternating current but operates on direct current. The ringing supply from relay SA provides a direct-current potential during both the ringing and silent interval to permit operation of relay TP during either the ringing or the silent period. The operation of relay TP releases relay R removing the ringing generator from the line. Relay TP, operated, locks through resistor RC, contact 1 of relay TP, contact 1 of relay LB, contact 8 of relay LA and contact 6 of relay C1, to ground. Since relay RV is operated, relay LA is maintained released and when relay R releases, relay L operates. The operation of relay L establishes a circuit from ground through contact 1 of relay L, contact 4 of relay RV and the winding of relay DR to battery, operating relay DR. Relay DR, operated, locks over a circuit from battery through the winding of relay DR, contact 2 of relay DR, contact 5 of relay C1, contact 3 of relay MR, contact 3 of relay LB and contact 3 of relay NA, to ground. Relay DR, operated, opens up the operating path for relay RV and relay RV releases. When relay RV releases, relay LA is operated from a contact on relay L and the operation of relay LA in turn operates relay LB. The circuits of the operation of both relays LA and LB have heretofore been traced. The call is then completed in a manner corresponding to that heretofore described for the condition whereunder a dispatcher originates a call except for the following differences. Since the call was assumed to be originated by a mobile unit, it is not necessary to transmit the calling dispatcher's channel identification tone. When relay R releases, it opens the operating path for relay TO. Further, since relay C1 operates before relay L, relay TR will not operate to supply ground for operating relay TO if relay TO is released. To insure the release of relay TO and prevent the channel identification tone from being transmitted, battery supply for relays LA and TR is connected through contacts of relay AT to prevent operation of relays TR and LA until relay TO releases relay BL and turns off the transmitter. Another difference is that after relay AT, Fig. 3, releases, relay LA operates over a circuit from ground through contact 1 of relay L, contact 3 of relay RV, winding of relay LA and contact 3 of relay AT, to battery. The operation of relay LA opens the locking path through its contact 5 for both relays CW and MR and relays CW and MR release. The release of relay MR by opening its contact 3 unlocks relay DR and relay DR releases. The locking path is necessary to insure that relay RV stays released until relays L and LA have operated.

When the dispatcher hangs up, all relays restore to normal if there is no waiting call. The locking path for relay LB was traced formerly from battery through the winding of relay LB, contact 5 of relay LB, contact 8 of relay C1 and contact 1 of relay NA, to ground. This path is extended through relay C1 to insure that relay C1 releases before relay LB is unlocked to release, so as to prevent ring-backs on the dispatcher's line.

*Call originated by dispatcher—system busy*

The manner in which the system functions when a call is originated by a dispatcher, and the system is already in use, will now be described.

It has heretofore been explained that when the system is in use, the relay RV, in all channels other than the one which is effectively in control of the system, will be operated and the circuit has been traced. Under this condition, if a call is attempted by a dispatcher, busy tone will be heard in the telephone receiver to indicate that the system is busy. This has also been described. In response to the dispatcher's call, the relay corresponding to relay L in the calling dispatcher's channel will operate in the usual manner. Since relay RV is operated, a circuit is established from ground through contact 1 of relay L, contact 4 of relay RV and the winding of relay DR, operating relay DR. The operation of relay DR establishes a circuit from ground through contact 3 of relay DR, winding of relay CW and contact 4 of the system busy key SY–BY to battery, operating relay CW. Relay CW, operated, locks over a circuit extending from battery through contact 4 of relay SY–BY, winding of relay CW, contact 3 of relay CW, contact 5 of relay LA and contact 9 of relay C1, to ground. Relay CW operated, establishes a circuit from ground through contact 2 of relay CW, winding of relay P1, contact 2 of relay P1, contact 1 of relay C2, contact 1 of relay C3, contact 3 of relay V and contact 7 of relay S, Fig. 2, to battery operating relay P1. The operation of relay CW also establishes a circuit from battery in parallel through contact 4 of relays CW in channels which are idle and the winding of relay V, Fig. 2. Ground for the operation of relay V is supplied through contact 1 of relay CW in the channel which actually has control of the system. This relay CW will be in the released condition and the relay LA, in the channel which is actually conditioned for communication, will be operated so that the circuit from ground through contact 1 of released relay CW will be extended through contact 6 of the operated relay LA to the lower terminal of relay V, Fig. 2, operating relay V. Relay P1 assigns channel 1, which is assumed to be presently attempting to make a call, to the sequence selection circuit as described hereinafter. The operation of relay V, by opening its contact 3 and simultaneously closing its contact 4, substitutes battery connected to contact 4 of relay V for the battery formerly furnished through contact 7 of relay S to maintain relay P1 operated. The operation of relay V arranges the timing circuit associated with relay T, Fig. 2, for a 15 second waiting period upon completion of the call which is in progress. This will be described in detail hereinafter. This waiting period is necessary to provide time for mobile units to register a "call waiting" after the call in progress has been terminated.

When the channel registering the "call waiting" is assigned to the system, a circuit is established from battery through contact 7 of relay S, contact 3 of relay V, winding of a relay corresponding to relay C1 in channel 1, contact 6 of relay P1, contact 2 of relay A, Fig. 6 and contact 1 of relay B, to ground operating the relay corresponding to relay C1. When the relay corresponding to relay C1 operates, a circuit is established from ground through contact 6 of relay C1, contact 8 of relay LA, contact 1 of relay LB, contact 2 of relay TP and the winding of relay R, operating relay R. The operation of the relay corresponding to relay C1 opens the operating path for the relay corresponding to relay RV. Relay RV, released, connects a circuit which supplies machine ringing having a 2 second ringing interval and a 4 second silent interval, for instance, to the circuit of the dispatcher who has registered a call waiting. This ringing cycle is distinctive from the ringing cycle heretofore described, namely, a one second ringing and a one second silent cycle, for instance, which identifies a call incoming from a mobile unit. The circuit may be traced from a source of alternating current RC2, Fig. 7, through contact 8 of relay RV, winding of relay TP, contact 4 of relay R, out over conductor T through the ringer thereat, back over conductor R, and contact 5 of relay R to ringing ground RG, Fig. 7.

When the call is answered, ground over the ring side of the line operates relay TP. The operation of relay TP releases relay R to disconnect the ringing generator and permit the call to progress as described in the foregoing except for relay TR. Under the conditions presently being described, relay C1 operates before relay L so that the operating ground for relay TR is supplied over a circuit extending from ground through contact 2 of relay L, contact 5 of relay RV, contact 5 of relay CW, contact 6 of relay MR and contact 2 of relay C1 to the right-hand terminal of the winding of relay TR. When relay AT, Fig. 3, is released, relay TR operates from battery through contact 3 of relay AT and applies ground to operate relay TO and to transmit the channel identification tone as described above. The operating path for relay TR is connected through normal contact 6 of relay MR to prevent the operation of relay TR when relay MR is operated in response to a call from a mobile unit as heretofore described. When relay C1 operated, ground for holding relay CW operated was transferred from contact 9 of relay C1 to a circuit which extends through contact 10 of relay C1 and contact 1 of relay NA to ground. When relay LA is operated in response to the answering of the call by the waiting dispatcher, the holding path for relay CW is opened at contact 5 of relay LA and relay CW releases.

*Enforced fifteen second idle circuit condition*

When the system is in use and there are additional "calls waiting," a 15 second enforced idle circuit condition is established at the completion of each waiting call. These 15 second "calls waiting" intervals are provided to allow mobile units, which may desire to call their dispatcher, an interval during which they can gain access to the sequence circuit and register a call waiting. In order to notify the mobile units that they can gain access to the sequence circuit and establish a call waiting condition, a tone, known as an attention tone, is transmitted from the base station during a 15 second interval after the completion of each call while there are calls waiting. How this is performed will now be described.

When the system is in use, a circuit is established from ground through contact 1 of relay CW, which is released in the channel which has access to the system, contact 6 of relay LA, which is operated in that channel, to the lower terminal of the winding of relay V. The relay corresponding to relay CW in all channels, which are registering "calls waiting," will be operated and battery to operate the V relay will be supplied through contact 4 of relay CW to the top terminal of the winding of relay V operating relay V. When relay V operates it transfers the battery supply for the operation of relays such as P1 and C1 from contact 7 of relay S to contact 4 of relay V. Relay V operated also establishes a circuit from ground through contact 1 of relay V and the winding of relay S, to battery, operating relay S. Relay S, operated, locks over a circuit from battery through the winding of relay S, contact 8 of relay S and contact 3 of relay U, Fig. 6, to ground.

When the call in progress is completed, relay V releases removing battery from all relays such as relays P1 and C1 except such relays as are operated and locked up to their own battery. This prevents the sequence circuit from assigning the next call. Relay V released also establishes a circuit from ground through contact 5 of relay AT, contact 2 of relay V and contact 6 of relay S and the winding of relay T, to battery operating relay T, Fig. 2. Relay S and relay T, when operated, turn on the base station transmitter to provide an interrupted attention tone and to start the gas tube timing circuit in the following manner.

The operation of relay T, Fig. 2, establishes a circuit from ground through contact 1 of relay U, Fig. 6, contact 6 of relay T, contact 5 of relay S and the winding of relay TO, to battery operating relay TO. Relay TO, operated, turns on the base station transmitter and connects it to the output of amplifier V2 as described in the foregoing. A ground, interrupted once per second, is supplied through contact 1 of interrupter SL, Fig. 2, contact 2 of relay T, contact 2 of relay S and the winding of relay SC, to battery operating relay SC. This interrupted ground operates relay SC for approximately 0.5 second each second, each time a ground pulse is applied. When relay SC operates it establishes a circuit from ground through its contact 1, contact 2 of relay SA, winding of relay SA and resistor RSA, to battery operating relay SA. Relay SB does not operate at this time because its winding is short-circuited through contact 1 of relay SB. Relay SA, operated, locks over a circuit from battery through resistor RSA, winding of relay SA, contact 1 of relay SA, contact 4 of relay S, contact 6 of relay T and contact 1 of relay U, to ground. Relay SA operated also disconnects the operating ground supplied from relay SC by opening contact 2 of relay SA. When relay SC releases, ground is removed from contact 1 of relay SB and relay SB operates over a circuit from ground through contact 1 of relay U, contact 6 of relay T, contact 5 of relay S, contact 1 of relay SA, winding of relay SB and resistor RSB to battery. When relay SC reoperates over the interrupter circuit, a circuit is established from ground through contact 1 of relay SC and contact 2 of relay SB to the lower terminal of the winding of relay SA short-circuiting the winding of relay SA and relay SA releases. When relay SC again releases it opens up the operating path for relay SB permitting relay SB to release. Thus, either relay SA or relay SB is operated for a time interval of approximately 1.5 seconds and both are released for a time interval of 0.5 second. A tone of a selected audio frequency is supplied from the output of the last tone generator, Fig. 9, to two parallel branches. One of the parallel branches extends through contact 5 of relay SA when operated. The other of the parallel branches extends through contact 3 of relay SB when operated. The branches join and the circuit continues through contact 3 of relay S and contact 4 of relay T, to the input of amplifier V2. This attention tone modulates the transmitter at the base station and is heard by the mobile units whenever their handsets are removed from their hangers and affords an indication of an interval during which any mobile unit may register a call waiting.

Attention is particularly called to the fact, as heretofore described, that when a dispatcher signals a mobile unit the transmitter carrier at the base station is modulated with a tone of a particular frequency identifying the calling dispatcher and actuating the receivers in each of the mobile units associated with that particular dispatcher. There will, therefore, be as many different tones available for this purpose as there are dispatchers or fleets connected with the system. The attention tone is of a particular single audio frequency and this particular audio frequency can be heard by all of the mobile units in all of the fleets of all of the dispatchers. The single common audio frequency attention tone which modulates the carrier from the transmitting station can be heard by any mobile unit when the receiver is removed from the hook.

When relay T, Fig. 2, operates, a circuit is established from battery, through contact 7 of relay T to the bottom electrode of gas tube V1 and to the timing circuit comprising resistor R6 and capacitors C3 and C4, to ground. A circuit may also be traced from ground through the winding of relay U and resistor R7, to the middle electrode of gas tube V1. After approximately 15 seconds, the capacitors are charged to a sufficiently high potential to trigger gas tube V1 and operate relay U. Relay U, operated, by opening its contact 3, opens up the locking path for relay S, releasing relay S. Relay U operated also removes ground which was maintaining relay TR operated and relay TR releases. Relay U operated also removes the holding ground for relay SA and relay SA releases. The release of relay S removes the identification tone from the input to amplifier V2. The release of relay S also releases relay T. The release of relay S also opens up the operating path for relay SC and relay SC releases. The release of relay S also restores the battery supply for relays such as P1 and C1 to contact 3 of relay V. When the battery supply is restored to relays such as P1 and C1 from contact 7 of relay S, the next scheduled call is completed by the sequence selecting circuit as described hereinafter.

*Call originated by mobile units—system busy*

When the system is busy "calls waiting" can be registered by the mobile units only while the attention tone is being transmitted. When the attention tone is heard in any mobile unit handset and the mobile unit wishes to register a "call waiting," a push-to-talk button is momentarily operated and the handset is restored to its hanger. This operation transmits an audio frequency tone characteristic of the particular fleet of which the mobile unit is a component. In response to this, as heretofore described, relay MR in the channel individual to the particular calling fleet is operated. Relay E, Fig. 3, does not operate in this case to momentarily interrupt a base station transmitter because ground necessary to operate relay E is removed at contact 1 of relay T, Fig. 2, as relay T is operated. Relay S and relay T are operated in the manner described in the foregoing when attention tone is transmitted. Under this condition, a circuit is established from ground through contact 1 of relay U, Fig. 6, contact 6 of relay T, contact 4 of relay S, contact 1 of the relay such as relay K1, Fig. 8, in the tone-operated switch individual to the particular fleet or dispatcher, contact 7 of the relay such as relay C1, Fig. 5, and the winding of the relay such as relay LB in Fig. 1, to battery operating relay LB. Relay LB, operated, locks over a circuit from battery through the winding of relay LB, contact 7 of relay C1, contact 7 of relay LB, contact 4 of relay S, contact 6 of relay T and contact 1 of relay U, to ground. Relay LB, operated, supplies tone for the mobile unit squelch circuit as described in the foregoing. The loudspeaker of all mobile units in the fleet are made operative by their squelch circuits and the attention tone and the channel identification tone are heard for the remainder of the 15-second waiting period. The reception of these two tones is an indication that the "call waiting" has been registered. If during the same 15-second period a call is registered by a mobile unit of another fleet, its identification tone will also be heard combined with the other two tones.

At the conclusion of the enforced idle circuit condition, relay U operates to open up the locking path for relay LB and relay LB releases. The release of relay LB removes the channel identification tone. Also, battery is applied to relay P— and relay C— to permit relay MR to assign the channel to the sequence selection circuit.

Since the call will not immediately be assigned to the system, it is necessary to provide for the transmission of the channel identification tone when the call is assigned to the system and answered by the dispatcher. Relay T, Fig. 2, operates during each waiting period and establishes a circuit from ground through contact 3 of relay T and the winding of relay X, Fig. 6, to battery operating relay X. Relay X, operated, locks over a circuit extending from battery through the winding and contact 2 of relay X, contact 2 of relay MD, Fig. 2, and contact 2 of key Talk, to ground. Relay X, operated, provides an operating path for relay TR, when the call is answered by the dispatcher, which may be traced from ground through contact 2 of relay L, contact 5 of relay RV, contact 5 of relay CW, contact 5 of relay MR, contact 3 of relay X, contact 2 of relay C1, winding of relay TR and contact 3 of relay LA, to battery. This insures the operation of relay TR, when the call is answered by the dispatcher, to transmit the channel identification tone as described above.

*Channel sequence selection circuit*

The function of the channel sequence selection circuit is to connect channels with "calls waiting" into the system in a progressive sequence regardless of the order in which the "calls waiting" are registered.

If the system is idle and a call is originated by one of the intermediate channels, relay P— and relay C— associated with the channel will operate and also relay A and relay B, Fig. 6, of the system control circuit. The P— relay, which is operated, locks up to battery through its contact 3 and ground from relay A and relay B is removed from all higher numbered channels preventing their C— relays from operating. The operation of the C— relay by opening its contact 1, such as the contact 1 of relay C2 or the contact 1 of relay C3, removes battery from all lower numbered relays P— to prevent their operation.

Assume now that "calls waiting" were registered by the first and last channels while the call last described was in progress. Relay CW in the first channel operates, locks up and supplies ground to the P1 relay. Since battery has been removed from this relay by the operation of any intermediate C— relay, typified by relay C2, relay P1 in the first channel does not operate at this time. When the last channel registers a "call waiting," relay CW and relay P3 in the last channel operate and lock up but relay C3 is prevented from operating by the removal of ground by any intermediate P— relay, typified by relay P2. At the end of the call in progress there is a 15-second enforced idle condition, during which battery is removed from the windings of all additional P— and all C— relays to prevent any from operating, since relay S in Fig. 2 is operated and relay V in Fig. 2 is released. The P3 relay associated with the last channel will remain operated because it is locked up to its own battery supply. At the end of the waiting period relay S releases supplying battery through its contact 7 to permit the operation of the unoperated P— and C— relays. Since the P— relays are slow to release, relay C3 in the last channel will operate first to complete the call.

After the call associated with the last channel is completed, there is another waiting period, with no P— relays operated. Relay A and relay B remain operated, however, because locking ground for relay A is supplied from contact 1 of relay S. At the end of the waiting period, relay A releases and opens up the locking path for relay B which is slow to release. During the time relay A is released and relay B is operated, ground is removed from the windings of the C— relays preventing them from operating, but allowing the lower numbered P— relays, associated with a "call waiting," to operate. When relay B releases, ground is restored to the chain circuit extending through the break contact, such as break contact 5 of the make-before-break combination of relay P1. The P— relay, associated with the first channel encountered in which there is a call waiting, will be operated and the circuit will be extended through contact 6 of such P— relays and the winding of relay C1, to battery on contact 7 of relay S, operating the C— relay associated with the channel. This mode of operation insures that when calls are waiting, the lowest numbered channel, having a call waiting, will obtain access to the system first and thereafter each higher numbered channel, in which there is a call waiting, will obtain access in ascending numerical order until all have been cared for.

*Disconnection of circuit when call is not answered by dispatcher*

Whenever a mobile unit signals its dispatcher or the dispatcher is assigned to the system after he has registered a "call waiting," all other calls are locked out until the call in progress is completed or the circuit is disconnected after failure of a dispatcher to respond within a predetermined interval. In the event that a dispatcher does not respond to a call originated by a mobile unit or by the sequence circuit after a dispatcher has registered a "call waiting," it is necessary to insure that the system is not tied up indefinitely. The present circuit is arranged so that under this condition the system is released from the called dispatcher's channel after an interval of approximately 40 seconds, if the call is not answered during this interval. This is performed in the following manner.

Whenever there are calls incoming to the dispatcher, his C— relay is operated and, until the dispatcher answers, relay LA and relay LB in his particular channel are released. Under this condition a circuit is established from ground through contact 1 of relay NA, Fig. 6, contact 8 of the relay corresponding to relay C1 in the channel involved, through contact 6 of relay LB and contact 10 of relay LA in parallel and through the winding of relay NU, Fig. 6, to battery operating relay NU. Relay NU, operated, establishes a circuit from battery through contact 1 of relay NU to the bottom electrode of gas tube V4 and also through resistor R18 and capacitor C9 to ground. Resistor R18 and capacitor C9 constitute a timing circuit which measures an interval of approximately 40 seconds allowed for the response of the called dispatcher. If the call is answered in less than 40 seconds, relay LA and relay LB operate and release relay NU to disconnect battery from the timing circuit. If the call is not answered within 40 seconds, the potential of the capacitor C9 will be raised sufficiently so that gase tube V4 fires, establishing a circuit from battery through contact 1 of relay NU, across the gap between the bottom and middle electrodes of gas tube V4 and through the winding of relay NA to ground operating relay NA. The operation of relay NA opens the path through which battery was supplied to the winding of relay NU and relay NU releases. Relays MR and CW also release. The operation of relay NA also establishes a circuit through contact 7 of relay R which relay is operated to apply ringing to the called dispatcher's line and the winding of the relay such as relay P1 associated with the called dispatcher and through its contact 3 to battery to hold the relay corresponding to relay P1 operated. When relay NU releases it discharges capacitor C9 through resistor R20 and contact 2 of relay NU to ground. The release of relay NU also disconnects battery from the timing circuit of gas tube V4 and from the path through gas tube V4 and the winding of relay NA, releasing relay NA. The relay such as the P1 relay is held operated while relay NA is operated to overcome the slow-to-release feature of relay NA. If the relay such as relay P1 were permitted to release while relay MR and relay CW were released, the corresponding relay such as relay C1 would release and assign the next channel. Under such a condition, the succeeding C— relay would operate and release relay MR and relay CW before relay NA could release. Thus, channels other than the channel which did not answer would be disconnected.

*Alarm circuits*

If the base station transmitter fails to radiate power when relay BL, Fig. 3, is operated, relay AT cannot operate. With relay AT released and relay BL operated, a circuit is established from battery through contact 1 of released relay AT, contact 5 of operated relay BL, contact 1 of relay FA and the winding of slow acting thermal relay AL, operating relay AL. Relay AL, operated, establishes a circuit from battery through contact 1 of relay AT, contact 5 of relay BL, bimetallic armature and contact 1 of relay AL and the winding of relay FA, to ground operating relay FA. Relay FA, operated, connects ground through its contacts 5 and 6 to operate well-known alarm circuits, not shown, but represented by a captioned rectangle, at a central alarm station. The operation of relay FA also establishes a circuit from battery through contact 1 of relay AT, contact 4 of relay FA, filament of transmitting failure lamp TRS–FL and contact 1 of relay CB to ground, lighting the lamp as an indication of the condition. Relay FA, operated, locks over a circuit from ground through the winding of relay FA, contact 2 of relay FA, contact 5 of relay BL and contact 1 of relay AT to battery. The operation of relay FA, by opening its contact 1 opens the operating path traced through the winding of relay AL to battery, releasing relay AL for future operation.

If the base station transmitter operates to radiate power when relay BL does not operate, relay AT operates and establishes a circuit from battery through contact 2 of relay AT, contact 6 of relay BL and the winding of relay AL to battery, operating relay AL. Relay AL, operated, establishes a circuit from battery through contact 2 of relay AT, contact 6 of relay BL, bimetallic armature and contact 1 of relay AL and the winding of relay FA to ground operating relay FA. Relay FA, operated, locks over a circuit from ground through the winding of relay FA, contact 2 of relay FA, contact 6 of relay BL and contact 2 of relay AT to battery. The operation of relay FA again operates the central office alarm circuits, but this time establishes a circuit from battery through contact 2 of relay AT, contact 3 of relay FA, filament of the false transmission signal lamp False, and contact 2 of relay CB to ground lighting the lamp as an indication of transmission without authorization.

A short circuit or "receiver off hook" condition on any dispatcher's line establishes a call and prevents use of the system by any other dispatcher or mobile unit until the trouble is cleared or line disconnected. Whenever a circuit is actuated by a dispatcher's line, relay BL is operated, as described, to turn on the base transmitter. Relay BL, operated, establishes a circuit from positive battery through contact 4 of relay BL, contact 3 of relay CA to the top electrode of gas tube V3 and to the timing circuit consisting of resistor R12 and capacitor C7. If relay CA is not operated as a result of a response to the call by a mobile unit within 40 seconds, the potential of the condenser rises sufficiently to trigger gas tube V3 and the circuit traced to its upper electrode is extended through its middle electrode, resistor R15, contact 6 of relay CB and the winding of relay CB to ground operating relay CB. Relay CB, operated, locks over a circuit from ground through the winding of relay CB, contact 4 of relay CB, resistor R13, and contact 4 of relay BL to battery. Relay CB, operated, opens the circuit of gas tube V3. Relay CB, operated, establishes a circuit from battery through contact 3 of relay CB, contact 1 of relay FA and the winding of slow acting relay AL to ground to operate relay AL after an interval. Relay CB operated also supplies battery through its contact 5 and the filament of the dispatcher out of service lamp DOS to ground, lighting this lamp as an indication of the condition. Relay CB operated also supplies ground through its contact 2 and resistor R16 to discharge the timing capacitor C7. After approximately 10 seconds, relay AL operates, in turn operating relay FA to bring in the central office alarms as described in the foregoing. When relay FA operates the transmitting fail lamp TRS–FL and the false transmitting lamp False are prevented from lighting by the removal of ground from contact 1 of relay CB.

In order to prevent a timing circuit from operating when ringing is applied to a dispatcher's line, the timing circuit capacitor C7 is connected to ground through contact 1 of relay MD, Fig. 2. Since relay MD does not operate unless a call is in progress or there is trouble on a dispatcher's line, ringing on the dispatcher's line will prevent timing capacitor C7 from charging up and firing gas tube V3.

*Testing and monitoring facilities*

Testing and monitoring facilities are provided to permit the technical operator to make test calls and to check the operation of the system. Each dispatcher's control circuit is equipped with a two-way non-locking key, such as key DS, Fig. 1, for permitting an attendant at the base station to signal any dispatcher. When the dispatcher's signaling key DS in any channel is operated, a circuit is established from battery through the winding of relay MR in that channel, contact 1 of key DS, contact 2 of relay MD, Fig. 2, and contact 2 of key Talk, Fig. 3, to ground operating relay MR. The operation of relay MR effects the ringing of the dispatcher associated with the channel in the same manner as described in the foregoing for a call incoming from a mobile unit. Each channel is also equipped with a key, such as key MUS, Fig. 1, for signaling the mobile units associated with the dispatcher connected to the particular channel. When the mobile unit signal key MUS is operated, a circuit is established from ground to contact 2 of key MUS, contact 7 of the relay such as relay C1 and the winding of the relay such as relay LB, to battery operating relay LB. The operation of relay LB effects the modulation of the carrier at the base station with the tone individual to the dispatcher and his mobile unit fleet as described heretofore. The operation of key MUS also establishes a circuit from ground through contact 1 of key MUS and the winding of relay TO to battery operating relay TO. The operation of relay TO turns on the base station transmitter which is modulated by the channel tone through amplifier V2 as heretofore explained.

The transmitting carrier key TC, Fig. 3, is provided to permit removing the base station transmitter from service when necessary. Operation of key TC by opening its contact 2 removes the battery supply for the radio transmitter plate relay, not shown, to prevent its operation. The operation of transmitting carrier key TC also supplies battery through its contact 3 and the filament of lamp TOS to ground lighting lamp TOS as an indication that the transmitter is out of service.

A system busy key SY–BY, Fig. 6, is provided as a means by which the technical operator may disable the system when necessary for maintenance purposes. Operation of the system busy key SY–BY establishes a circuit from ground through contact 2 of key SY–BY and the winding of relay A to battery operating relay A. The operation of relay A causes busy tone to be applied to all dispatcher's telephone lines in a manner heretofore described. The operation of key SY–BY, by opening its contact 4, removes the battery supply, which permitted the registration of "calls waiting," by mobile units or dispatchers to prevent the registration of "calls waiting" while the system is in the assumed condition. The operation of key SY–BY establishes a circuit from battery through the winding of relay X, Fig. 6, and contact 1 of key SY–BY, to all contacts such as open contact 3, in parallel, associated with all relays such as relay K1, Fig. 8. If while the system is in the assumed present condition, for maintenance purposes, any mobile unit initiates a call, the relay corresponding to relay K1, individual to the fleet with which the calling mobile unit is associated, will be operated closing its contact 3 and operating relay X. The operation of key SY–BY establishes a circuit from battery through contact 3 of key SY–BY, contact 1 of relay X and the filament of mobile unit call lamp MUC to ground, if relay X is operated in response to an incoming call from a mobile unit, as an indication of the condition. If relay X is operated it locks over a circuit extending from battery through the winding of relay X, contact 2 of relay X, contact 2 of relay MD, Fig. 2, and contact 2 of key Talk, Fig. 3, to ground. When the call is answered by the technical operator, key Talk is operated to its alternate position, releasing relay X and extinguishing lamp MUC.

Figure 4:
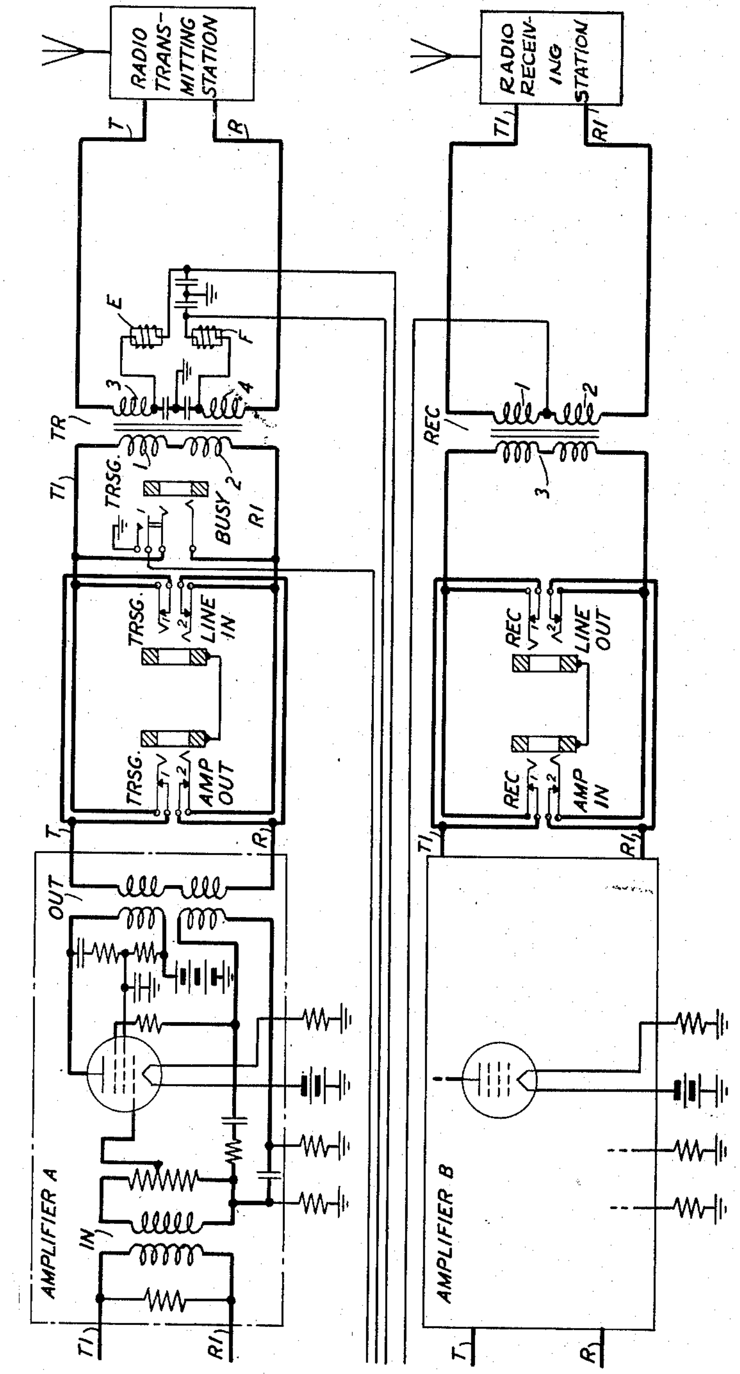

It has been explained that during the 15-second waiting interval, described in the foregoing, relay T, Fig. 2, is operated in turn operating relay X, Fig. 6. If the system busy key SY–BY, Fig. 6, is operated during this interval, the mobile unit call lamp MUC will light giving a false indication of a mobile unit call. Relay X may be released at the termination of the 15-second waiting interval by operating key Talk which removes the holding ground by opening contact 2 of key Talk. This will extinguish lamp MUC and place relay X under control of the mobile unit relays such as relay K1. A transmitting busy jack TB, Fig. 4, is provided to permit turning on the base station transmitter and supplying test tones when necessary for lineup or maintenance.

*Operator's telephone circuit*

An operator's telephone circuit OT, Fig. 3, is provided which may be connected through jacks A and B to permit the technical operator or attendant at the base station to talk or monitor on the system. To talk on the system it is necessary to operate key Talk to its alternate position. This connects the telephone set to the two-wire line side of the circuit which permits talking either to the dispatchers or out through the transmitter. To talk to any of the dispatchers without broadcasting over the radio transmitter it is necessary to operate the key Talk to its Talk position. This connects the telephone set to the two-wire line side of the circuit and permits talking to the dispatchers. If it is desired to talk over the radio transmitter it is also necessary to insert a dummy plug in the transmitter busy jack TB to operate the BL relay and turn on the transmitter carrier.

The technical operator may monitor on the system by operating the monitoring key MON, Fig. 3, which bridges the receiver of the telephone circuit OT across the two-wire portion of the circuit which permits both incoming and outgoing conversation over the system to be heard. The monitoring transformer MT is of high impedance to minimize interference with the system during monitoring.

What is claimed is:

1. A two-way radio telephone communication system having a central station, a plurality of dispatchers' telephone stations, an individual telephone line connecting each of said stations to said central station, a radio transmitter and a radio receiver, individual to said central station, connected to said central station, a plurality of sources of audio frequency tone at said central station, each of said tones of differing frequency, one of said frequencies for calling an individual fleet of mobile units for each of said telephone stations, means at said central station responsive to the initiation of a call by any one of said telephone stations for automatically connecting said one station to said transmitter and means at said central station responsive to the initiation of said call for impressing said one station's individual calling tone on the said transmitter.

2. A system in accordance with claim 1 including means for automatically disconnecting said tone from said transmitter after a measured interval.

3. A system in accordance with claim 1, said system having means therein responsive to a call incoming through said receiver for automatically and selectively ringing one of said telephone stations.

4. A system in accordance with claim 1 in which said central station has a plurality of frequency responsive switches, one of said switches individual to each of said fleets, means responsive to a call incoming through said receiver from a mobile unit in a particular one of said fleets for selectively actuating the one of said switches individual to said one of said fleets, and means responsive to the actuation of said one switch for operatively connecting the telephone station individual to said one fleet to said receiver.

5. A system in accordance with claim 1 having means responsive to a call incoming through said receiver from a mobile unit in a particular one of said fleets for automatically ringing a particular telephone station individual to said particular fleet.

6. A system in accordance with claim 1 having means responsive to a call incoming through said receiver for automatically ringing a particular station and other means responsive to said ringing for automatically transmitting a revertive ringing signal to indicate that the station is being rung.

7. A system in accordance with claim 1 having means therein, responsive to a call incoming through said receiver, for connecting a source of interrupted ringing current to one of said lines to one of said telephone stations and other means responsive to said call for automatically connecting to said transmitter corresponding interrupted revertive ringing as a signal that said station is being rung.

8. A system in accordance with claim 1 having a sequence circuit at said central station and means in said sequence circuit for automatically registering a waiting call while said system is busy.

9. A system in accordance with claim 1 having a sequence circuit at said central station, means in said sequence circuit responsive to a call incoming from any of said stations, while said system is busy, for automatically registering a waiting call and means in said sequence circuit responsive to a call incoming from said receiver while said system is busy for automatically registering the call.

10. A system in accordance with claim 1 having a call waiting registering sequence circuit, means in said circuit responsive to calls incoming from said lines while said system is busy for registering said calls in said sequence circuit, means in said sequence circuit responsive to a call incoming from said radio receiver while said system is busy for registering the call in said sequence circuit and a preference arrangement in said sequence circuit for affording prior access to said system to said call from said receiver when said system is available.

11. A system in accordance with claim 1 including means for indicating that said system is busy and means responsive to an attempted call from any of said lines while said system is busy for applying said indication to said line.

12. A system in accordance with claim 1, said system having means therein responsive to an attempted call by one of said lines while said system is busy for applying a busy indication to said one line and other means responsive to said attempted call for simultaneously registering a call waiting.

13. A system in accordance with claim 1 having means therein responsive to attempted calls while said system is busy for automatically registering calls waiting and means therein responsive to said registration for automatically ringing said stations in a predetermined sequence.

14. A system in accordance with claim 1 having means therein for registering attempted calls while said system is busy, a first means in said system, responsive to the availability of said system to a station after the registry of a call waiting thereby, for connecting a first source of ringing current to said connection to said station, said current having a cycle comprising a ringing interval and a silent interval of first durations, and a second means therein responsive to a call incoming through said radio receiver for connecting a second source of ringing current to said connection to said station, said second current having a cycle comprising a ringing interval and a silent interval of durations different from said first durations.

15. A system in accordance with claim 1 having automatic means therein for ringing one of said stations in two different manners responsive to two different types of calls.

16. A system in accordance with claim 1 having automatic means therein for transmitting a signal from said transmitter to indicate that calls waiting may be registered.

17. A system in accordance with claim 1 having automatic means therein responsive to a completed call for transmitting a characteristic signal.

18. A system in accordance with claim 1 having means for registering a plurality of calls waiting while said system is busy and automatic means responsive to the completion of a call waiting for transmitting from said transmitter a characteristic attention signal connoting that other calls may be registered as waiting during a measured interval.

19. A system in accordance with claim 1 having, in combination, means for transmitting a characteristic fleet calling signal, means for transmitting a characteristic reverting ringing signal and means for transmitting a characteristic attention signal, to invite the registry of a call waiting, while the system is busy, all of said signals distinctive, one from the other.

20. A system in accordance with claim 1 having means therein responsive to a call incoming through said receiver for automatically selectively ringing one of said lines, means for measuring a predetermined interval during which said line is rung and means for automatically terminating said ringing at the end of said interval.

21. A system in accordance with claim 1 having means therein responsive to the answering of a call transmitted from said transmitter to momentarily interrupt transmitting from said transmitter, so as to reset the squelch circuits in a called fleet.

22. A system in accordance with claim 1 having means therein responsive to the initiation of a call by one of said lines, for preventing access to any other of said lines through said receiver.

23. A system in accordance with claim 1, said system having means responsive to a call incoming through said receiver for automatically selecting a particular called line, means responsive to said selection for automatically connecting a source of ringing current having successive ringing and silent intervals to said called line and means responsive to the answering of said called line for automatically tripping said ringing during either said ringing or said silent interval.

24. A system in accordance with claim 1, said system having means responsive to the transmission of said calling tone for automatically terminating said transmission after a predetermined interval.

25. A system in accordance with claim 1, said system having a source of busy tone, means for connecting said source to said lines, means responsive to the calling by any one of said lines while said system is busy for connecting said source to said connecting means for all lines other than said one line, and means responsive to an attempted call by another one of said lines while said system is busy for operating said connecting means to connect said source to said line attempting a call.

26. A system in accordance with claim 1, monitoring means at said transmitter means at said central station responsive to the transmission of a calling tone by said transmitter and its reception by said monitoring means for disconnecting the source of said transmitted calling tone from said transmitter after a predetermined interval.

27. A system in accordance with claim 1 including means responsive to the completion of a call, while calls are waiting, for transmitting a distinctive audio frequency attention tone as an invitation to all mobile units to register a call waiting and means responsive to the reception of the registry of a call waiting from a mobile unit for transmitting the audio calling tone individual to the fleet of which the calling unit is a component, to operate a squelch circuit in each unit of the fleet so that each such mobile unit may hear simultaneously said attention tone and said fleet calling tone, as an indication that a call waiting has been registered by a unit of the fleet.

28. A system in accordance with claim 1 having, in combination, means for simultaneously transmitting an attention tone and a fleet calling tone.

29. A system in accordance with claim 1 having means for automatically registering a call waiting by a mobile unit and means responsive to said registration for automatically signaling said mobile unit that said call has been registered.

30. A system in accordance with claim 1 having automatic means for registering calls waiting, means responsive to the completion of a call waiting, while another call is still waiting, for transmitting a signal as an invitation to register a call waiting, automatic means for measuring a predetermined interval during which said signal is transmitted and means for automatically transmitting another signal, in response to the registry of a call waiting during said interval, for the remainder of the duration of said interval.

31. A system in accordance with claim 1 having means responsive to the initiation of a call by one of said stations for automatically energizing said transmitter, means thereupon responsive to the non-reception of energy from said transmitter for operating an alarm to indicate the condition.

32. A system in accordance with claim 1 having means therein at said central station for monitoring communication through said system.

33. A system in accordance with claim 1 having means therein for disabling communication through said system in response to a testing connection to said system and means in said system responsive to an attempted call incoming through said receiver for indicating said attempt while said system is disabled.

34. A system in accordance with claim 1 having means therein for disabling communication through said system in response to a testing connection, a busy signal source at said central station and means at said central station responsive to said connection for connecting said testing source to said lines.

35. A system in accordance with claim 1, ringing signal means at said central station, means responsive to a call incoming from said receiver for selectively connecting said ringing means to one of said lines to ring the station connected thereto, means responsive to said ringing for simultaneously modulating said transmitter with audible ringing tone as a revertive ringing signal, an attendant's circuit at said central station, means for connecting said attendant's circuit to said system, means responsive to the manual actuation of a key at said central station for connecting said ringing means to one of said stations, and other means responsive to the actuation of said key for simultaneously transmitting audible ringing tone through said transmitter.

36. A system in accordance with claim 1 having automatic means responsive to ringing one of said lines for simultaneously transmitting an audible tone through said transmitter as a reverting ringing signal.

37. A system in accordance with claim 1 having automatic means responsive to ringing one of said lines under a first and under a second condition for automatically transmitting simultaneously distinctive revertive ringing tones as signals indicating the two conditions.

38. A system in accordance with claim 1 having means for indicating unauthorized transmission through said transmitter.

39. A system in accordance with claim 1 having means for measuring a predetermined interval after a calling signal is transmitted from said transmitter, during which interval an answering signal may be received through said receiver, an alarm, and means responsive to the non-reception of said answering signal before the termination of said interval for operating said alarm.

40. A system in accordance with claim 1 having means at said central station for operatively removing said transmitter from service and a signal responsive to the operation of said means for indicating the condition.

41. A system in accordance with claim 1 having means at said central station to register calls incoming through said receiver as calls waiting, and means for modulating said transmitter output with a plurality of distinctive audio frequency tones, at the same time, one tone for each of said fleets to indicate a plurality of calls waiting at the same time from a plurality of fleets.

42. A system in accordance with claim 1 having means responsive to a calls waiting condition for simultaneously transmitting a distinctive audio frequency tone for each of said fleets having a call waiting.

43. A system in accordance with claim 1 having means therein responsive to the connection of any one of said lines to said transmitter and receiver for effectively preventing the connection of all others of said lines to said transmitter and receiver and other means responsive to said connection for preventing any call incoming from said receiver from being effectively connected through said system.

44. A system in accordance with claim 1 having means responsive to the establishment of a communication condition through said system for preventing other operative access to said system, means reponsive to an attempted call at any time from any of said lines while said system is busy, for registering a call waiting, means responsive to the completion of a call while calls are waiting for modulating said transmitter output with a distinctive audio frequency attention tone indicative of the calls waiting condition and means responsive to the reception of an incoming call through said receiver while said attention tone is being transmitted for registering the call as another call waiting.

45. A system in accordance with claim 1, an individual channel control circuit interconnecting each of said lines, through a single common system control circuit and a single common transmitter and receiver control circuit, all at said central station, to said transmitter and receiver, a relay in each of said channel control circuits for connecting said tone source, individual to its connected telephone station, through said common system control circuit and said common transmitter control circuit to said transmitter.

46. A system in accordance with claim 1 having, in combination, a multi-unit frequency selective switch, a common input to said switch connected to said receiver, means for impressing a plurality of tones of differing frequencies, one for each fleet, on said input, means in said switch responsive to the particular frequency impressed to said input for selectively actuating one of a plurality of output switches controlled by said input and means at said central station responsive to a busy condition of said system for disabling said output switches.

47. A system in accordance with claim 46 having, in combination, means for disabling said output switches while said system is busy, means for disabling said output switches generally while calls are waiting and means for enabling said switches during predetermined intervals while calls are waiting.

48. A telephone communication system having a plurality of land telephone stations, a plurality of mobile units, a radio telephone circuit having automatic means therein for interconnecting said stations and said units, said system having a single two-way communication channel for interconnecting any of said stations to a fleet of said units individual to each of said stations, a sequence circuit in said automatic means, means in said sequence circuit for automatically registering a call waiting responsive to a call from any of said stations while said system is busy, means in said sequence circuit for automatically registering a call waiting in response to a call from any of said mobile units, while said system is busy and means for subsequently automatically completing all calls waiting in a predetermined sequence.

49. A two-way radio telephone system having a plurality of dispatchers' telephone stations connected to an automatic switching central station, a radio transmitter and a radio receiver individual to said central station connected to said central station, means at said central station, responsive to a call originated by any of said telephone stations, for automatically operatively connecting said calling telephone station to said transmitter and receiver, a plurality of sources of audio frequency tone, each of a different frequency, at said central station, one of said sources individual to each of said telephone stations, means at said central station, responsive to a call originated by any of said telephone stations for modulating said transmitter output with said tone individual to said calling station, means at said central station for automatically establishing a two-way telephone circuit from said calling station through said transmitter and receiver, means at said central station responsive to said establishing of said circuit for preventing operative connection to said circuit of any other of said telephone stations, means at said central station responsive to said establishing of said circuit for preventing operative access through said receiver to any telephone station other than said calling station, means at said central station for informing any telephone station attempting a call while said two-way circuit is established that said system is busy, and means at said central station for automatically registering any call attempted either from another of said telephone stations or through said receiver, while said system is busy, as a call waiting.

50. A system in accordance wiht claim 49 including automatic means for completing calls waiting in a predetermined sequence.

No references cited.